United States Patent [19]

Lane et al.

[11] Patent Number: 4,679,137
[45] Date of Patent: Jul. 7, 1987

[54] PROCESS CONTROL INTERFACE SYSTEM FOR DESIGNER AND OPERATOR

[75] Inventors: Leslie A. Lane, Santa Clara; Lynn V. Lybeck, Moss Beach; David S. Perloff, Sunnyvale; Chester L. Mallory, Campbell, all of Calif.

[73] Assignee: Prometrix Corporation, Santa Clara, Calif.

[21] Appl. No.: 729,153

[22] Filed: Apr. 30, 1985

[51] Int. Cl.$^4$ .............................................. G06F 15/46
[52] U.S. Cl. .................................. 364/188; 364/200; 340/706
[58] Field of Search ............... 364/146, 188, 191, 192, 364/193, 171, 200 MS File; 340/706, 712

[56] References Cited

U.S. PATENT DOCUMENTS

| | | | |
|---|---|---|---|
| 4,204,253 | 5/1980 | van den Hanenberg et al. | 364/200 |
| 4,528,623 | 7/1985 | Tachibana | 364/191 |
| 4,570,217 | 2/1986 | Allen et al. | 364/191 X |
| 4,586,035 | 4/1986 | Baker et al. | 340/712 |

OTHER PUBLICATIONS

Perloff, D. S. et al., "Dose Accuracy and Doping Uniformity of Ion Implantation Equipment", *Solid State Technology*, Feb. 1981, 112-120.

Wittkower, A. B., "The Effect of Ion Implanter Design Upon Implant Uniformity", *Solid State Technology*, Sep. 1982, 77-81.

Perloff, D. S., "Four-Point Probe Correction Factors for Use in Measuring Large Diameter Doped Semiconductor Wafers," *Journal of the Electrochemical Society: Solid-State Science and Technology*, Nov. 1976, 1745-1750.

Perloff, D. S. et al., "Contour Maps Reveal Non-Uniformity in Semiconductor Processing", *Solid State Technology*, Feb. 1977, 31-37.

*Primary Examiner*—Jerry Smith
*Assistant Examiner*—Clark A. Jablon
*Attorney, Agent, or Firm*—Flehr, Hohbach, Test, Albritton & Herbert

[57] ABSTRACT

A system and method for computer control of machine processes, including a dynamic menu feature used in the selection of processes and the definition and selection of operating parameters used by a process control program to direct the performance of the process by the machine.

Data structures for a multiplicity of processes are defined and stored. Values stored in the data structures indicate which processes are available for use and the process control program associated with each process. Furthermore, for each parameter of each process a data structure contains an indicia of whether the parameter is a forced entry parameter (which must be given a value before the process is run), a may change parameter (with a default value that may be changed when the process is run), or a locked parameter which has a fixed value.

An engineering set up program enables interactive computer controlled performance of the steps of storing the above-mentioned data structures, entry of values into the data structures, and the entry of default parameter values. An operator control program, utilizing the stored data structures, enables interactive computer controlled performance of the steps of selecting one of the enabled processes, entry of parameter values, and running of the selected process.

32 Claims, 24 Drawing Figures

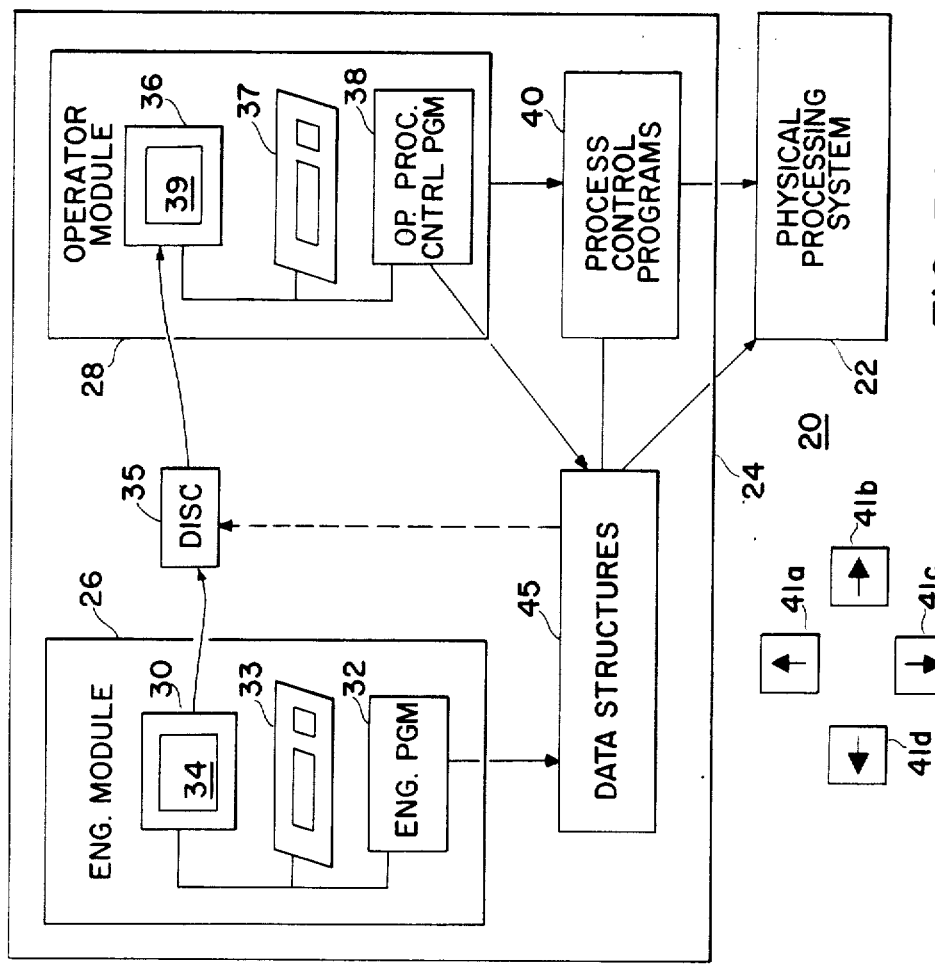
FIG. 3A
FIG. 3B
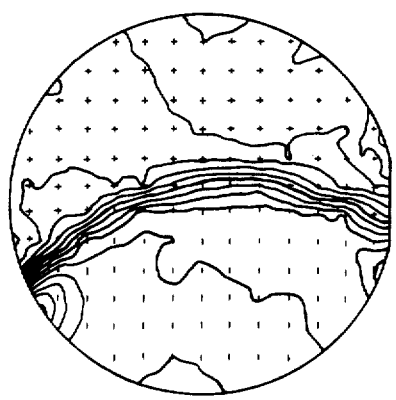
FIG. 1
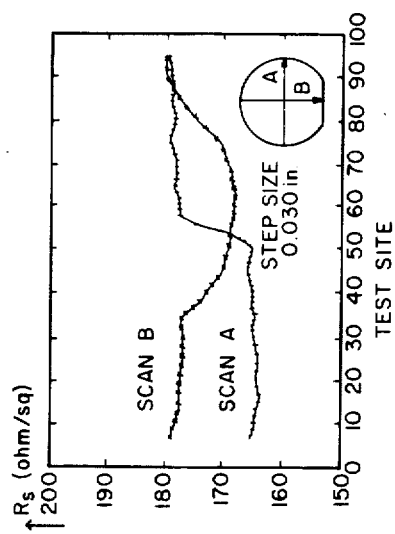
FIG. 2

GROUP PROMPT

PROCESS PROMPT

HEADER

MEMORY STORAGE SCHEME

PROMPT DATA STRUCTURE

PARAM DATA STRUCTURE

HEADER DATA STRUCTURE

PROCESS CONTROL INTERFACE SYSTEM FOR DESIGNER AND OPERATOR

This invention relates generally to systems and methods for computer control of machine processes and in particular to systems and methods for computer control which involve menu driven approaches to selection of processes and the definition and selection of the operating parameters used by the computer control program to direct the performance of the process by the machine.

BACKGROUND OF THE INVENTION

Importance of Sheet Resistance Mapping of Semiconductor Wafers

The invention described in this specification may be applied generally in computer controlled machines which perform various production or testing processes. It may also be applied to data collection and data base management programs. However, the detailed description of the invention will be given in terms of the control of an automated resistivity tester for performing sheet resistance mapping of semiconductor wafers. This equipment is used to characterize the performance of semiconductor wafer manufacturing equipment utilized to form surface layers of specific target conductivity value as part of the process of manufacturing semiconductor devices such as, for example, large scale integrated circuits.

The preferred vision of an automated resistivity tester to be controlled by this invention is disclosed in copending and commonly assigned U.S. patent application Ser. No. 726,498, filed on Apr. 24, 1985, and entitled "APPARATUS AND METHODS FOR SEMICONDUCTOR WAFER TESTING." This disclosure is specifically incorporated herein by reference. The use of computer controlled testing apparatus of this type as the background environment for demonstrating the advantages of this invention is especially meaningful because of the importance of the semiconductor industry to the advancement of science and technology in many areas, including areas of factory automation to which this invention may be very meaningfully applied. To understand the overall importance of automated resistivity testing to the semiconductor industry, reference is made to the helpful background information given in the above-identified copending application on the status of the industry and the particular importance of performing automated resistivity testing on semiconductor wafers which have been subjected to ion implantation.

The correctness and uniformity of implant dosage across a semiconductor wafer can be determined in an automatic sheet resistance mapping system which has the capability of taking multiple test readings in both a contour map and diameter scan mode. It is well-known in the prior art to utilize an in-line four-point probe to make sheet resistance measurements at various preselected testing locations on the implanted semiconductor test wafer. Sheet resistance mapping and the theory and results of such testing techniques are discussed in detail in the following papers and publications, which are incorporated herein by reference:

D. S. Perloff et al., "Dose Accuracy and Doping Uniformity of Ion Implantation Equipment," *Solid State Technology*, February 1981, pp. 112–120;

Andrew B. Wittkower, "The Effect of Ion Implanter Design Upon Implant Uniformity," *Solid State Technology*, September 1982, pp. 77–81;

David S. Perloff, "Four-Point Probe Correction Factors for Use in Measuring Large Diameter Doped Semiconductor Wafers," *Journal of the Electrochemical Society: Solid-State Science and Technology*, November 1976, pp. 1745–1750; and D. S. Perloff, et al., "Contour Maps Reveal Non-Uniformity in Semiconductor Processing," *Solid State Technology*, February 1977.

FIG. 1 illustrates a printout of a contour map which shows a pattern of non-uniform implantation of a wafer. The heavy contour line represents the mean resistivity value of the wafer. The lighter contour lines outline regions which differ from the mean value by a preset percentage. The + and − symbols represent test sites for which the resistivity value is above and below the mean value, respectively. FIG. 2 illustrates a printout of two diameter scans on the same wafer. Here the actual resistivity values are plotted as a function of position of the test site on the diameter of a wafer. From these tests and printouts, the engineer in charge of a process can determine whether the ion implantation equipment is operating properly. Specific discussion of the diagnostic capability of the resistivity tests is contained in the above-referenced articles.

In a co-pending and commonly assigned patent application entitled "Apparatus and Method for Resistivity Testing," Ser. No. 704,296, filed Feb. 22, 1985, a novel arrangement for orienting the resistivity test probe for improved accuracy in performing four-point probe sheet resistance measurements on conductive surface layers of a semiconductor wafer is disclosed. The specification of that application is hereby incorporated by specific reference.

To encourage the use of testing equipment such as automated resistivity testers, it is important to provide an overall computer control program for the tester which is easy for the engineer to set up to perform in-process monitoring measurements which will provide meaningful data. It is also important for the control program to be simple for the operator to run with confidence and consistency to produce meaningful data. Engineer and operator convenience and confidence are the keys to increasing acceptance of automated process control and testing in all industries.

Prior Art Computer Control Methods

It has become a standard approach in the art to use a programmed digital computer to control the operation of various types of machinery which have the capability to perform a variety of tasks or the capability to perform the same task in a variety of ways. Because of the reduction in cost of digital microcomputer technology, it has become common, for example, for manufacturers of home appliances to use dedicated microcomputers to control the functions of microwave ovens, dishwashers and the like. Since these machines are dedicated to performing relatively few tasks and a relatively few parameters are required to be entered, e.g., temperature and time, the entry of parameters is typically done on a specially configured keyboard placed on the machine itself. In addition to operator controlled tasks set up with entry of all parameters, these appliances typically have a group of predefined parameters sets which can be selected by the operator with input of a single item or code number from a menu of predefined processes.

Computer control of industrial machines generally involves a more complex set of processes and a larger number of parameters which must be entered for the machine to carry out a selected process. Because of this complexity, the set up of the machine for performing a desired process meaningfully is usually done by an engineer who understands the overall functioning of the system and the interaction of the process parameters with the process control programs of the machine. In the better designed systems, this engineering set up is facilitated by a machine control program which provides the engineer with a sequence of different menus or prompts which direct process selection and parameter entry. These menus or prompts are typically presented individually and in sequence. In situations requiring a substantial number of menu screens, process or parameter value choices on one screen may be affected by earlier or later choices several screens away. Thus the engineering set up operation may require continuous paging back and forth between screens to check on processes selected or parameters previously entered so that overall meaningful and consistent process selection and parameter entry can be achieved at each screen level.

The complxity and inconvenience of the engineering set up protocol of most computer controlled machines tends to discourage their use except by the more sophisticated engineers at the most sophisticated companies. Even when these systems are used, the requirement to provide written operator instructions introduces a frustration that tends to discourage widespread use of the technology to achieve the benefits it could produce.

After the engineering set up is performed, actual operation of the machine is carried out by an operator who is given specific written directions on which process to select and the specific values of specific parameters to enter. In other words, the engineer carries out the necessary experiments to select the process and associated parameter values which will direct the computer to control the performance of the machine and the operator follows a set of specific instructions to select the right process and enter all of the parameter values required. In doing so the operator typically uses the same set of screens as did the engineer, but with the parameter values to be entered noted on an instruction sheet. If the operator uses the wrong set of instructions or enters incorrect values for critical parameters, the machine will not carry out the selected process correctly. Depending on the machinery being controlled, various types and magnitudes of damage may result. Operator error due to carelessness or lack of adequate communication or training is a large factor in reducing the effectiveness and value of automated process control.

In a variation of this approach, the computer controlled machinery of the prior art is sometimes provided with non-volatile storage media for storing the parameter values which are selected by the engineer for running one specific process. The operator can then simply enter the appropriate storage medium for the appropriate process to be performed and start the machine to carry out the process. This approach provides more mistake-proof, automatic entry of parameters (if the operator selects the right storage medium), but does not provide any flexibility of operator entry of a few parameters which are quite variable and most conveniently entered just before the process is run. It also does not permit entry of data items which are preferably entered for overall process tracking.

Prior Art Wafer Resistivity Tester System and Method

To illustrate the typical limitations which are present in prior art systems, the features and performance of a prior art computer controlled resistivity test system will now be described.

This prior art system, sold under the Prometrix trademark "Omnimap" and having Model No. 111, includes a combined engineer and operator module, a set of process control programs and a resistivity tester 22. Tables 1, 2 and 3 represent three computer display screens generated by the prior art Omnimap system.

The prior art Omnimap system allows the operator of the system to select a task using a menu such as the one shown in Table 1. A task is selected by moving a visible pointer (shown as a rightward pointing arrow in Table 1) to the desired menu task item and then pushing the ENTER key on the computer keyboard.

The tasks available on the menu of the prior art Omnimap system include both operator tasks, appropriate for use by operators in a production environment, such as collecting contour data, and engineer setup tasks, such as disk maintenance tasks.

Referring to Table 2, parameter entry into the prior art Omnimap system is performed by keyboard entry of parameter values in response to a message displayed on the STATUS line at the bottom of the display. Thus, in response to the message "Operator:", the operator types in his or her name. As each parameter value is entered, it is displayed on the display screen. In Table 2, the display shows that the OPERATOR and SHIFT parameter values have already been entered and the NUMBER OF SITES parameter is in the process of being entered.

Some parameters, such as SHIFT, can only have one of a number of predefined values (e.g., DAY, SWING, or NIGHT). In the prior art Omnimap system, the value for such parameters is entered by using a selected key (such as the down arrow cursor key on the keyboard 37) to toggle through the available preset responses. When the appropriate parameter value appears on the STATUS line, the operator hits the ENTER key to select that parameter value. This method of parameter value entry is used for several parameters including the Number of Sites parameter.

Referring to Table 3, after all the parameter values for a selected process have been entered, all the entered parameter values are displayed, and instructions for the operator are displayed on the STATUS line. Typical instructions include: requesting the operator to adjust certain control dials on the resistivity tester so that the requested test can be performed, and instructing the operator to hit the ENTER key on the computer's keyboard when a wafer has been mounted on the tester and the operator is ready to begin the wafer test procedure.

As can be seen, the operator is allowed by the prior art Omnimap system to select and perform any of the tasks which are also provided for use by the engineer. Also, the operator is required to provide a value for all of the variable parameters of the selected process. These will typically be provided to the operator on an instruction sheet previously prepared by the Engineer. Another major limitation of the prior art Omnimap system, which is believed to be typical of much of the prior art, is that only one process parameter data structure, for the process currently being set up to run by the operator, is available for use by the software. The significance of this limitation, which will be become more apparent from the description below of the preferred embodiment of this invention, is that only one process can be set up at a time and all parameters must be entered each time that process is set up.

Improvements within the scope of the prior art which could be added to the above described prior art Omnimap system include requiring a password to be entered to use tasks which are appropriate for use only by an engineer, and the storage of several predefined sets of parameter values for use by the operator. The present invention provides a much more comprehensive approach to overcoming the limitations of the above described prior art Omnimap system.

It can thus be seen that, in the prior art, the options tends to be complete parameter entry flexibility by the operator (with large error probability) or complete inflexibility which stymies reasonable engineering creativity in designing the set up for some operator discretion in parameter entry. All operators are treated alike and all have the same level of access to process selection and parameter entry.

OBJECTS OF THE INVENTION

It is therefore the principal object of this invention to provide an improved system and method for menu driven computer control of real time processes.

It is another object of this invention to provide a computer-based process control system and method which facilitates engineering set up of process selection, parameter definition, and parameter selection.

It is another object of this invention to provide a computer-based process control system and method which facilitates operator selection and running of a particular process.

It is another object of this invention to provide a computer-based process control system and method which enables convenient engineering control of levels of operator access to various processes through use of a portable data storage medium.

SUMMARY OF THE INVENTION

The above-identified objects of this invention are achieved in a system and method of controlling a process using a programmed digital computer which includes the feature of enabling each of the process parameters to be denoted in the data structure used by the process control programs as an operator unalterable parameter having a fixed value, an operator alterable parameter having a default value (i.e. one value which the operator may leave or change) or as forced operator entry parameter that must be supplied by the operator before the process will run. The system and method of this invention further incorporates the feature of providing an arrangement for denoting in the data structure whether a particular process which has been defined and set up by the engineer is available to be run by the operator. This invention also features an arrangement in which the data structures for a multiplicity of processes are stored on a plurality of individual, operator related portable storage means so that different operator level access to running of the multiplicity of specified processes can be provided and different levels of operator discretion in entering parameter values is facilitated.

Another important feature of this invention is a "dynamic menu" feature which greatly facilitates the engineering set up function by providing dynamically changing submenus as item selection in a higher level menu is toggled from one position to another.

Engineering Set Up and Operation Control Program Features

More specifically, this invention features a method of controlling a process using a programmed digital computer which begins with the step of establishing a set of process control programs with each of the programs having an associated set of predefined parameters required for its operation. The method further includes the step of defining a data structure format for each of the process control programs with the data structure format including a parameter denoting means and a parameter value storing means. The parameter denoting means provides for denoting each of the predefined parameters as an operator unalterable parameter having a fixed value, an operator alterable parameter having a default value or a forced operator entry parameter that must be supplied before the process is run. The parameter value storing means enables values for each of the predefined parameters to be stored.

Next an engineering set up control program is established for the purpose of enabling interactive computer controlled performance of certain engineering set up steps. These steps include defining and storing, for each of a multiplicity of specified processes, an actual data structure in accordance with the data structure format for a specified or selected one of the process control programs and then specifying one of these processes for engineering set up. Thereafter, the engineer can enter into the parameter denoting means for the specified process a value for each of the predefined parameters to specify it as an operator unalterable parameter or an operator alterable parameter or a forced operator entry parameter. This is followed by the step of entering into the parameter value storing means fixed values for the operator unalterable parameters and default values for the operator alterable parameters.

The method further includes the step of establishing an operator control program which enables interactive computer controlled performance of certain operator control steps. The operator control steps include selecting one of the processes, utilizing the stored data structure to enable operator entry of values for the operator alterable and forced operator entry parameters for the selected process and then enabling the running of the process control program corresponding to that selected process only after values have been entered for all forced operator entry parameters.

Contrasted with prior art arrangements for engineering set up and operator control of a process, the system and method of this invention provides fo a high level of engineer discretion in denoting process parameters as fixed, operator alterable or forced entry. Furthermore, the denoting of these process parameters can be different for each of the different processes which the engineer has set up for running a particular machine. Thus the engineer may, for example, specify one particular process with all fixed unalterable parameters and another process with all operator alterable parameters and another process which has a mix of such parameters along with forced entry parameters. The value of this additional capability will be more apparent from the detailed description given below, but it should be apparent that this feature of the invention enables the engineer to use his own judgment to tailor the denotion of the status of specific process paramters of each process.

This can be based on the requirements of the process, the level of operator skill, or any other factors which the engineer, in his judgment, may deem pertinent.

In a preferred embodiment, the system and method of this invention further includes, in the data structure format for each of the processes defined, an availability denoting means which enables the engineer to denote whether the running of the corresponding process control program is enabled or disabled. With this feature in the data structure format, the step of establishing an engineering set up control program further includes enabling interactive computer controlled performance of the step of entering into this availability denoting means a value to designate or specify whether the running of that specified process is enabled or disabled. In the preferred embodiment the process selection step of the operator is restricted to selecting a process from those processes which have a corresponding data structure wherein the running of those processes is denoted as enabled.

In other word, with this feature, the engineer is able to have complete control over whether a process which has been set up is available for use by the operator. However, all disabled processes still have all of the data structure available to the engineer for review, editing or other activity. Thus, the engineer can be in the middle of setting up a particular process which he doesn't wish the operator yet to have available, but maintain the data structure of that process in the overall storage medium of the system without running the risk that it will be utilized by an operator before it is ready.

This feature of denoting the enabling or disabling of each individual process for which a data structure format has been defined by the engineer cooperates with another feature of this invention to provide a convenient approach to providing different operator access levels to the running of a multiplicity of specified processes. To achieve this, the engineering set up control program further enables interactive computer controlled performance of the step of storing, on each of a plurality of individual, portable data storage means, the data structure for each of the multiplicity of processes. The method then further includes the step of reading and storing the data structures for a multiplicity of processes from one of the operator related portable storage means so that the data structures are thereafter available for use by both the engineering set up control program and the operator control program.

In this fashion, the availability denoting means in the data structures stored on the operator related storage means control the availability of each of those processes for use by the operator control program. In other words, the operator having that storage means to read stored data structures into the machine can only run processes which are denoted as enabled in the stored data structures. Furthermore, these data structures stored on the portable storage means can be easily and quickly reconfigured by the engineer using the engineering set up control program by a simple change in the value stored in the availability denoting means of the data structure on the storage means. Thus one particular experienced operator may be provided with wide access to various processes to be run by the machine whereas another, less experienced operator may only have access to one or two processes. This discretionary set up of process access levels for various operators is fully under control of the engineer. Each operator can be provided with a separate portable storage means such as a disc which fully controls which processes that operator can run on the equipment.

This feature of control of operator access level by way of data structure stored on a portable storage means can be further adapted to specific control of level of operator discretion in parameter entry utilizing the feature of the parameter denoting means in the data structures for each of the processes. Accordingly, two different operators having access to running of the same process can be provided with different levels of discretion in parameter entry based on either the experience or competence of the operator. Only the engineer who has access to the engineering set up control program by way of password entry can alter the data structures on the individual operator related storage means. However, since all of the data structures for all of the processes are stored on the portable storage means, the engineer can very easily and quickly reconfigure operator access level to processes and operator discretion in parameter entry by inserting the operator related storage means and running the engineering control program to alter the content of the data structures denoting either process availability or parameter designations.

The advantages of this feature of the invention to both the engineer and the operator will be more fully explained in the discussion of specific examples given below. It should, however, be appreciated that this level of control by the engineer of all aspects of operator access to running of processes and entering of parameter values provides an advanced level of flexibility and convenience which overcomes many of the frustrations involved in the limited choices available in prior art systems.

Dynamic Menu Display Feature

The objects of this invention are further achieved in accordance with another feature of this invention involving dynamic menu display. This feature is separate and independent from the features already described, in one sense, but is also cooperative with the above-described features of the invention to provide additional, powerful convenience in especially the engineering set up control program aspect of this invention. More specifically, the dynamic menu display feature of this invention involves a system and method for displaying and selecting menu items on a computer display device.

The steps of the method include defining a plurality of separate main menu items and defining a plurality of separate groups of auxiliary menu items each being associated with at least one of the main menu items. Two separate menu display regions are established on the computer display device with each region being capable of displaying multiple menu items and an associated selectably positionable pointer to an individual one of the menu items. As an example, the main menu items could be the names of a group of processes and the auxiliary menu items could be the individual process names within each group.

The method continues with the step of displaying in the first menu display region at least a plurality of the main menu items (and preferably all of them if possible) together with the associated pointer positioned at one of the displayed menu items. Simultaneously there is displayed in the second menu display region at least a portion of one of the groups of auxiliary menu items associated with the main menu item being pointed at together with the associated pointer positioned at one of the displayed auxiliary menu items. Finally the method includes automatically responding to a position change of the pointer in the first menu display region to point at a new main menu item by altering the second menu display region to display at least a portion of one of the groups of auxiliary menu items associated with the new main menu item being pointed at.

In other words, as the pointer in the first menu display region toggles from one item to another, the display of a group of auxiliary menu items automatically changes to one of the groups associated with the new main menu item being pointed to. Preferably for full value of this feature, the alteration of the second menu display region to display a new group of auxiliary menu items is accomplished virtually instantaneously so that each item selection choice in the second menu display region is instantly viewable. Selection and paging through the groups of auxiliary menu items can then be quickly accomplished by toggling the pointer in the main menu item display region.

This dynamic menu feature can be extended, within the limits of display device size, and resolution and computer memory availability and operating speed to three or more menu display regions arranged in a hierarchy such that any toggling of the pointer in one of the menu display regions causes dynamic change in the menu items displayed at all lower order display regions on the display device. This dynamic menu feature can also be coupled with other menus which are not hierarchal, such as where items in a third menu region are linked one-to-one with items in a second menu region. Full appreciation of the advantages and the value of this dynamic menu display feature will be gained from reading the detailed description given below. However, it should be apparent from this summary that this dynamic menu feature adds dramatically to the convenience of using the engineering set up control program in a system where a large number of processes are available for set up by the engineer. These processes can be grouped with main group names, secondary group names and finally process means (in a three region display situation) so that the engineer can quickly see all of the specific processes which are available for set up.

Furthermore, when the engineer has activated a particular pointer at the process name level of the dynamic display, he will have full information on the group name and subsidiary group name associated with that individual process since all this information will still be in front of him on the screen. The engineer need not page back and forth to recall where the various levels of screens through which the display has paged in order to recall what the migration path to that process name selection involved. If the engineer mistakenly selects a particular process and wants to go to the right process by toggling the selected item in the highest menu in the hierarchy, this can be done very quickly by activating the pointer at the higher menu level in the display hierarchy and moving the pointer to a new process group name with instantaneous update to all subgroup names at the second menu display egion and all process names available for the process subgroup name pointed to in the third display region.

As will be seen from the detailed description given below, this dynamic menu feature by itself and integrated with the other features of this invention provides a uniquely powerful tool for set up and running of real time process control programs in a complex, sophisticated machine control environment. Utilization of the features of this invention enable the engineer to proceed with both convenience and confidence in performing the engineering set up function because the engineer has full satisfaction that all aspects of process availability and parameter value designation are fully under his control. Operator convenience and confidence is also achieved because the operator has been given access only to selection of processes and entry of parameters which are within the competence and qualifications of that operator. The level of possible errors in process running under operator control will be substantially reduced by use of the features of this invention. The level of convenience and confidence provided to both the engineer and operator will encourage use of computer based real time process control by organizations with a wide range of levels of engineering and manufacturing sophistication.

Other objects, features and advantages of this invention will be apparent from a consideration of the detailed description given below in conjunction with the accompanying drawings.

BRIEF DESCRIPTION OF THE DRAWINGS

FIGS. 1 and 2 show an exemplary contour map and diameter scan produced by an automated semiconductor wafer resistivity tester.

FIG. 3a is a block diagram of a computer system incorporating the apparatus of this invention. FIG. 3b shows a set of cursor movement keys.

DESCRIPTION OF THE PREFERRED EMBODIMENTS

Figure 4:
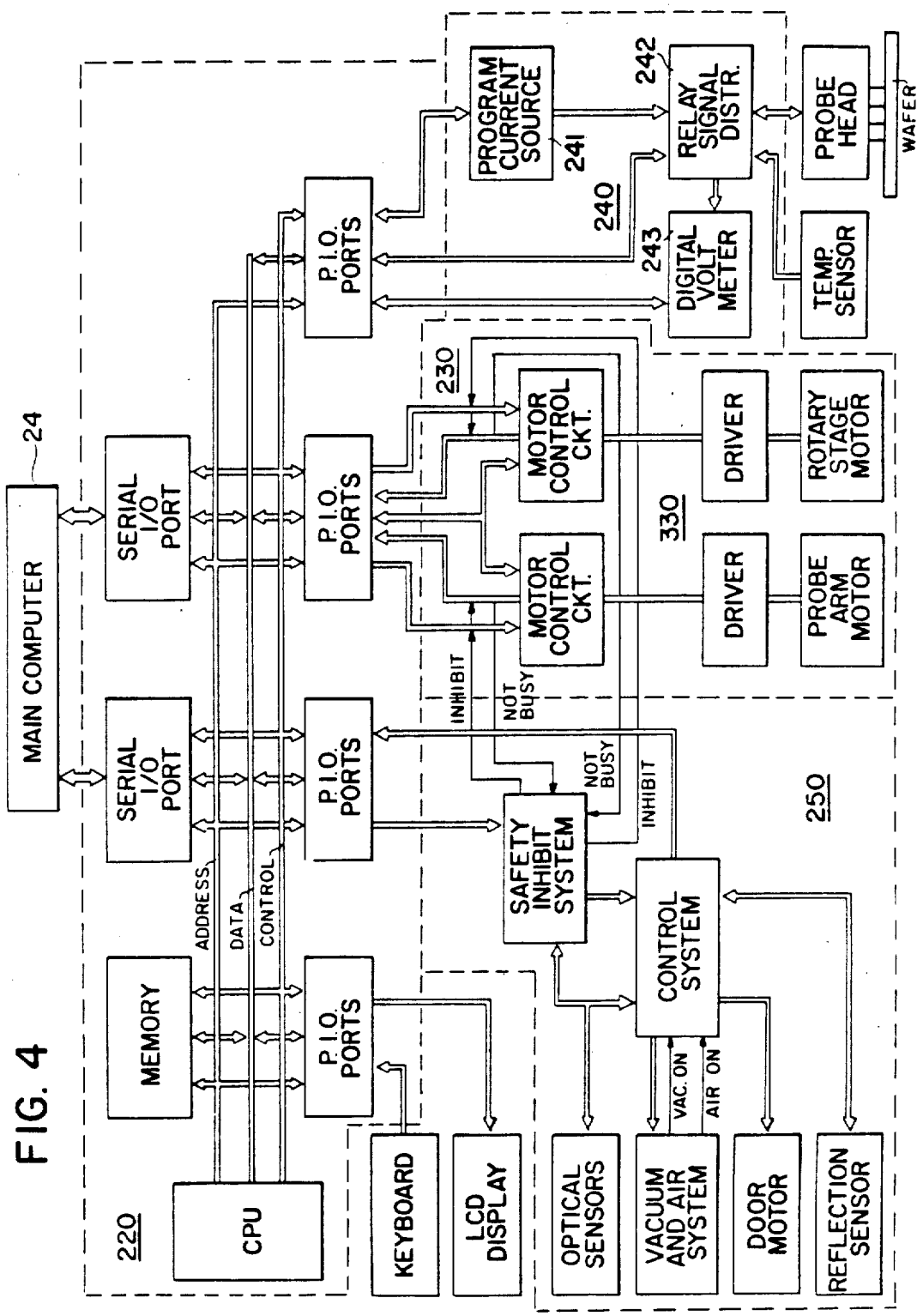
FIG. 4 is a block diagram showing how the preferred embodiment of this invention is used to control an automated semiconductor wafer resistivity tester.

FIGS. 1-2 have already been discussed above, with reference to the background of this invention, and therefore need not be described further.

System Modules

Referring to FIG. 3a, there is shown a block diagram of a system 20 incorporating the apparatus of this invention and capable of carrying out the method of this invention. A physical processing system 22, such as a semiconductor wafer resistivity tester, is controlled by a computer based control system 24. The control system 24, in accordance with this invention, is divided into two modules: an engineering set up module 26 and an operator module 28. The control system 24 further includes a set of process control programs 40, each of which is used to control the physical system 22 while it is performing a specified type of process.

The engineering set up module 26 includes a computer 30 and software for the computer comprising an engineering set up control program 32. A keyboard 33 or an equivalent device is used to enter commands and data into the computer 30.

As will be explained in greater detail below, the engineering set up control program is used to define the degree and types of constraints which limit and control the types of processes which can be run using the physical system 22. In the preferred embodiment, the computer 30 is an HP 150, which incorporates a touch screen 34 (i.e., a screen which is sensitive to the position at which it is touched).

The operator module 28 includes a computer 36 and software for the computer comprising an operator process control program 38. The operator module 28 is used by an operator (i.e., a person) to select and run processes on the physical system 22 which have been previously set up using the engineering set up module 26. A keyboard 37 or an equivalent device is used to enter commands and data into the computer 36, which also has a touch screen display device 39.

As will be described in greater detail below, the operator process control program 38 includes a process selection program for selecting which of the available processes is to be run on the physical system 22, and a parameter entry program for specifying parametric values for use in conjunction with the process to be run by the physical system. Importantly, the parameter entry program includes means for preventing the selected process from being run until certain parameters (preselected by the engineering set up module) are specified.

The engineering set up module furthermore includes means for storing a representation of the set up decisions made by the engineering set up module 32 on a portable magnetic disc 35. These choices are represented by entries in a set of data structures 45 which are used by both the engineering set up and operator process control programs.

In the preferred embodiment, the software for each of the modules 26 and 28 includes both the engineering set up and the operator process control programs. Therefore, the operator module 28 can also be used as an engineering set up module. Similarly, if the engineering set up module 26 is connected to a physical system 22, it can also be used as an operator process module.

In the preferred embodiment the physical system 22 is a wafer resistivity tester and there are three process control programs 40. One process control program, called Contour Map, causes the computer 36 in the operator module to send control signals to the tester 27 which direct it to measure and record the resistivity of a semiconductor wafer at a specified number of separate position coordinates on the wafer. Another process control program, called Diameter Scan, generates control command which direct the tester 22 to measure and record the resistivity of a semiconductor wafer at a specified number of separate test sites along a diameter line. A third, called Quick Check, measures the resistivity of a semiconductor at a small number of test sites to quickly determine the approximate resistivity of a semiconductor wafer.

A list of the most important computer programs in each of the software modules in the preferred embodiment is shown in Table 4. The function, method, and other relevant details of each of these programs will be discussed in more detail below.

Referring to FIG. 3b, there is shown a set of standard cursor movement control keys 41a–41d which are included in the keyboards 33 and 37 of the engineering and operator modules 26 and 28. As will be described below, the cursor movement keys are used in the preferred embodiment to move certain pointers on the displays 34 and 39 of the engineering and operator modules 26 and 28. The direction of pointer movement associated with each cursor key is indicated by the arrow symbol thereon.

Operator Control and Engineering Set Up of Automated Resistivity Tester

The system and method of this invention can be utilized with respect to any physical processing system 22 which is set up for computer control using process control programs. To illustrate this invention, however, the detailed description below will illustrate the use of the invention in a presently preferred embodiment involving control of an automated resistivity tester of the type described in the above-referenced copending application. FIG. 4 shows a block diagram of the electronic control systems which are used in this automated resistivity tester and this diagram will be used to illustrate the relationships between the functions of the engineering set up program, the operator process control program and the physical process control programs.

FIG. 4 shows a main computer 240 which is communicating with a dedicated microcomputer 220 which is actually controlling the operational functions of the resistivity tester. For simplicity, it will be assumed that the main computer 240 is a single computer having both the engineering module 26 and the operator module 28 available therein. To utilize this invention in the system of FIG. 4, the engineering set up program, the operator process control program, and the physical process control programs will all be predefined by the company which is supplying the system. The physical process control programs which run the physical processing system, i.e. the resistivity tester, determine to a large extent the data structure format and the content of the engineering set up program and the operator process control program.

Automated Resistivity Tester Features

In the case of the automated resistivity tester to be used in this discussion, there are three process control programs with which the system is provided: (1) a Contour Map program, (2) a Diameter Scan program, and (3) a Quick Check program. Each of these process control programs is available in the memory of the main computer 24 and comprises a series of software control commands which are sent sequentially to the dedicated microcomputer 220 which interprets the command and, in turn, sends control commands to other electronic modules of the system to cause certain specific functions to be performed. The module designated 230 in FIG. 4 controls the positioning of the wafer and the probe head to determine the position coordinates of the current test site on the semiconductor wafer. The module designated 240 in FIG. 4 controls the measurement parameters and the measurement configuration, including the value of electrical current to be sent to the probe tips from current source 241, which probe tips will receive the current through the relay signal distribution network 242 and which probe tips will be coupled to the digital volt meter 291.

The Contour Map program and the Diameter Scan program each include a set of program instructions which direct the microcomputer 220 to command the module 230 to position the probe head in the tester at a series of individual test sites in a prearranged sequence. The number of sites is a parameter that the engineer or operator must enter. The position coordinates of each site will be determined by the program from other parameters such as wafer size and test diameter. The Contour Map program selects test sites dispersed over a two-dimensional array of test sites within the specified test diameter. The Diameter Scan program selects test sites which are regularly spaced along a diameter of the wafer with a specified orientation angle.

These programs also include a set of program instructions which direct the microcomputer 220 to command the module 240 to make a measurement at each of the individual test sites using the value of the entered current parameter. The above-identified copending application contains a detailed explanation of the sequence of commands that are provided in the process control programs of the resistivity tester.

This brief explanation is provided here to illustrate the complexity of the system as a basis for showing the need for providing the engineer and the operator with and engineering setup program and operator control program which render the tasks to be performed by these persons easy and convenient to carry out without requiring a detailed knowledge of how the resistivity tester is functioning. This explanation further is provided to illustrate that the process control programs together with the physical system which they control determine the data structure formats, and the content of the engineering set up program and the operator control program. Once these programs have been defined and written, the overall system is ready to be made available to the engineer to carry out the task of setting up the system, using his own discretion in important areas, for the operator thereafter to utilize to direct the system to perform configured versions of the various available processes.

In other words, using the system and method of this invention, the engineer is provided with an overall software system which is configured with a predefined data structure format for each of the predefined process control programs. The predefined engineering set up program enables the engineer to perform final operator-related configuration of a multiplicity of versions of the processes which the system is capable of carrying out. This is done on a one version at a time basis with full control by the engineer of (1) the process group names and process names to be assigned to the individual process versions, (2) the process groups and individual process versions which are available for operator running, and (3) the status of the individual predefined parameters as fixed, operator alterable, or forced entry. At this level of explanation, the engineering setup tasks still sound relatively complicated and formidable, but the step-by-step explanations given below will show that the engineering setup of each process involves a series of straightforward and easy steps which lead to a very powerful and advantageous final system capability.

It will be helpful for understanding of the engineering set up program and the steps involved therein if the functions of the operator process control software for a system which the engineer has already configured are explained first to show the advantageous end result of creative use of the engineering set up software tools.

Operator Control Program Overview

When the system is turned on, it displays the lead-in screen shown in Table 5 below. The lead-in screen simply identifies the software program, displays a copyright notice and a warning concerning the proprietary rights in the system. The prompt line at the bottom of the screen directs the operator to touch the screen to start the running of the operator control program. The HP 150 system uses a touch screen capability as one of the operator entry features and a number of other approaches could be employed if other computer systems were used. These will be discussed below.

The operator assigned to carry out some resistivity testing operations on one or more wafers has, in the preferred embodiment, an operator-related disc on which the engineer has caused to be stored all of the data structures for a multiplicity of processes. The operator inserts this disk in the HP 150 computer, touches the touch screen, and the system loads the stored data structures from the disk into internal memory of the computer.

Process Group Selection

After the operator touches the lead in screen, the menu in Table 6 is displayed on the touch screen. This menu has four display areas: a top prompt line with operator instructions, a central area with nine boxes in which process group names predefined by the engineer are displayed, a command area entry below the central area with configurable command names and functions in four boxes, and a bottom prompt line with operator instructions.

Six process group names are displayed in this menu, five of which happen, in this example to be the names of various ion implantation systems. From this it can be seen that the engineer has elected to provide process group names which are associated with the wafer processing equipment which was used to produce the wafers to be tested on the resistivity tester. Three of five process group names have highlighted display regions, designated here by the combined solid and dashed lines, but typically indicated on the screen by a bright reverse video region or other highlighting technique. The operator knows from prior instruction that only the highlighted items are available for selection at this step and that the system will not respond to touching a box which is not highlighted.

The operator knows from the traveler, a process instruction sheet which accompanies the wafer(s) to be tested, which implanter the wafer was processed on. For this example we will assume the implanter was the NOVA NV10-1 and the operator touches that box to select the process group to run. The system responds by displaying the next menu, shown in Table 7. The previously selected process group name is now displayed at the right of the top prompt line for informational purposes.

Process (Configuration) Selection

The menu in Table 7 directs the operator to select a configuration for the test process to be run on the tester. In this case, the engineer has set up eight separate process configurations within the NOVA NV10-1 group name. The engineer has also, in his discretion, named these separate process configurations in a particularly meaningful way, as facilitated by the engineering set up program to be described below. Each process configuration name includes a designation of the implant dosage level (e.g., 1E12 which is scientific notation for an implant dosage of $1 \times 10^{12}$ atoms per square centimeter), the implanted dopant species (e.g., BORON) and the type of test (and related process control program) to be performed on the wafer (e.g., MAP or DIA, MAP signifying use of the Contour Map tester program, DIA signifying use of the Diameter Scan tester program).

The operator will see on the traveler the implant dosage used and the type of test requested by the engineer. We will assume for this example that the 1E13 BORON (MAP) test is requested. The operator sees that the display block with that name is highlighted, designating process availability, and touches that block on the screen to invoke that test program. The system responds by displaying the screen shown in Table 9.

Table 8 shows the screen that the operator would have seen if the EXTRION DF4 process group had been selected in the first menu screen. This shows that the Extrion implanter is being devoted to arsenic implants and the engineer is using the same naming convention for the individual process names in the EXTRION DF4 group.

Parameter Entry

The screen in Table 9 is for parameter entry by the operator. It includes a top line with prompts and information display on the group name selected, the process selected, and the tester process control program (i.e. CONTOUR MAP) which will be invoked when the selected process is actually run. Under the top prompt line is a header block which has been configured by the engineer to have a fixed heading followed by two forced entry parameters: OPERATOR and SHIFT. The operator knows these are forced entry parameters because the field or area where the information is to be entered is in bright reverse video (designated by the double asterisk "**" to the right of the area in the Table). Parameters which are operator alterable, but not forced entry parameters, are shown in normal reverse video (designated by a single asterisk "*" in the Table). Parameters with fixed values are shown in normal video (designated by the lack of an asterisk in the Table).

It should be understood that OPERATOR and SHIFT are not process related parameters, but are data parameters which the engineer, in his discretion, has decided to track and thus to force the operator to enter before the process has been run. Only process control parameters are used by the process control program to determine what commands are to be sent to the tester 22. Another type of parameter, called an analysis control parameter, is used to control the analysis performed by the process control program on the data collected while the process is run.

The two forced entry parameters are followed by an operator alterable parameter line which the engineer has left undesignated, but may have requested the operator in written instructions to enter certain data tracking parameters under certain circumstances. The operator will type in on the keyboard, the OPERATOR and SHIFT parameters in sequence, entering each by depressing the cursor down arrow on the keyboard to reposition the pointer (shown as an arrow) to the next parameter field. The pointer will usually have an initial position at the first parameter which must be entered by the operator and this feature is part of the operator control program software.

After the operator has entered OPERATOR and SHIFT, the operator can move the cursor or pointer down to the test parameter entry area of the screen by using the cursor down key. This area displays ten parameter names, some of which are process parameters, some of which are analysis control parameters and some of which are data parameters. The process parameters are NUMBER OF SITES, WAFER DIAMETER, TEST DIAMETER, and MEASURE CURRENT. The analysis control parameters are CONTOUR INTERVAL and SORT CRITERIA. The others are data parameters.

The engineer has previously denoted the first two parameters to be operator unalterable parameters, probably on the basis that the engineer has determined that he always wants 225 sites measured on these boron implanted wafers and the wafers will always be 3.0 inch wafers because the implanter is set up to implant 3.0 inch wafers. (The operator knows that they are fixed because they are not highlighted and furthermore the cursor or pointer cannot be positioned on that line.) There is no need to allow the operator to alter these parameters and there is good reason not to have the operator enter these parameters at all since a mistake could be very costly in terms of improper test results which might force the implants to be repeated on different wafers. In many prior art systems, the operator would have to enter these parameters from an engineer instruction sheet and an entry error could occur. Here the engineer has fixed the parameter values as the correct ones to use.

The operator alterable parameters are designated with a single asterisk in the Table, and the operator has discretion, within the instructions from the engineer, to alter these parameters in certain test situations. (Another operator having a different disk with different data structures thereon may, for example, have different alterable parameters, either fewer or more.) The operator will enter all of the forced entry parameters, and then note that a START box in the programmable command line is now present. This signifies to the operator that all forced entry parameters have been entered and the system is prepared to run the selected process on the wafer.

The operator can still change any of the alterable parameters, including forced entry parameters if necessary. Once all parameters are correct, the operator touches the START box and the process is run by the tester under computer control without further action by the operator. The operator will be prompted by the system to load a wafer on the wafer test platform of the system. After the operator confirms that a wafer has been placed on the wafer test platform, the tester system will take over and perform the configured CONTOUR MAP process invoked by the operator and the measurement data will be stored on the disk of the operator or on other data storage media.

While the CONTOUR MAP program is being run by the tester, the screen displays the resistivity measurements as they are received by the system's computer, and it also displays information regarding the number of sites to be tested, the number of sites tested so far, and statistics on the measurements received. When the tester is finished, the wafer platform will present the wafer back to the operator, and the second box of the command line will display NEXT WAFER. The operator can load another wafer on the platform for running the same test or can touch CHANGE to alter the parameters for the next test, using the same process program, or can touch EXIT to go back to the first menu to select another process group.

From this explanation, it will be appreciated that the operator control program is very easy for the operator to use with confidence. Assuming that, in configuring the various processes of the system, the engineer has employed process group titles and process names which are meaningful to the trained operator or are otherwise provided on documentation which the operator automatically has in his possession, the process selection step by the operator is greatly facilitated. Furthermore, the system automatically communicates to the operator the status of each parameter. With the already entered default values and fixed parameters, the operator has only to enter those forced entry parameters and make any changes in the operator alterable parameter values which the engineer has instructed or which the traveler accompanying the wafers to be tested signifies. Compared to the prior Omnimap system approach discussed in the introduction above, it will readily be appreciated that the chances for operator entry error have been substantially reduced, the convenience of parameter entry has been substantially enhanced and the flexibility of upgrading the operator capability is greatly facilitated.

Engineering Set Up Control Program Overview

The operation of the engineering set up control program to produce the configuration of the system discussed above will now be explained. When the engineer starts the system, he is presented with the same initial lead-in screen as the operator. Access to the engineering set up control program is through password, and the engineer enters the appropriate password on the keyboard and depresses the return key. The next screen presented on the touch screen is shown in Table 13 and is called the MAIN MENU screen.

Task Selection

This screen has two menu display regions in the central area of the display where main menu items and subsidiary menu items are displayed using the dynamic menu display feature of this invention. The subsidiary menu items shown in the right hand region correspond to engineering set up tasks which are part of the group of tasks designated CONFIGURATION since that is the main menu item being pointed to at this time. Table 14 shows the items in the subsidiary menu when the pointer in the main menu region is toggled, using the up or down cursor keys, to the DATA PRINTING item.

The CONFIGURATION group of engineering tasks is the most important one and will be described in detail. To initiate the performance of this group of tasks, the engineer touches the GO command box since the OPERATOR PROMPTS task is generally performed first. The system responds by presenting the screen shown in Table 15, but with blank areas (or initial, suggestive examples) in the three central menu display regions to be filled in by the engineer. The TITLE and CONFIGURATION areas are designated for process group names or titles and configuration titles, respectively. The TEST TYPE area is linked one-to-one, in this case, to the configuration name, and designates the particular one of the process control programs to be invoked by selection of that configuration. In other words, the configuration name is for a preconfigured process (from a process parameter standpoint and a data structure content standpoint) corresponding in type to one of the prearranged types of test program that the resistivity tester can run.

Operator Prompt Editing Task

There are a number of different ways the engineer can proceed to use the PROMPT EDITOR for initial set up of a multiplicity of processes. If the engineer has preplanned all the initial groups and associated configurations, the screen in Table 15 can be edited by entering all of the group titles and configuration names at one time. Later these can be added to, deleted or changed at will. For this example, we will assume that the engineer wants to setup configured test processes for each of the different ion implanter machines that his wafer fabrication area utilizes in day-to-day processing of semiconductor wafers. Using the up and down cursor control keys, the engineer points to one of the first five lines under the title region, touches the CHANGE box, enters the name or other designation of an implanter, and then continues with this procedure for each implanter.

Then, going back up to the first line in the TITLE display region, the engineer repositions the pointer to the CONFIGURATION display region (by using the rightward cursor movement key) and enters one-by-one all of the test configuration names for the EXTRION DF4 group of tests. Then the pointer is moved to the TEST TYPE display region, and at each line corresponding to a CONFIGURATION name, the engineer touches the CHANGE box and toggles through the process control program names, using the up and down cursor control keys, until the desired control program name is displayed. In this case, four of the configurations will use the CONTOUR MAP program and four will use the DIAMETER SCAN program.

Thereafter, each of the following lines in the TITLE display region is pointed at and the same sequence of steps is performed to name the configuration processes corresponding to each implanter name and to select one of the process control programs to be invoked when that process is selected. It will be remembered that all of this set up activity controls what the operator sees on the two menu screens which provide process group and individual process selection prior to parameter entry. The process group names appear on the first screen (Table 6) and the process names appear on the second screen (Table 7 or 8) depending on the process group name selected. Table 16 shows, for example, that the process names entered by the engineer for the NOVA NV10-1 test group correspond to what the operator sees in Table 8.

Once these steps have been performed, the OPERATOR PROMPTS function has been completed, subject to modification by the engineer at will. The engineer now has all these title and process designations stored in temporary memory in the data structures associated on a one-for-one basis with each process. It will be seen that, in the system as configured, the engineer can define nine process group names and can designate nine individual process names for each individual group, giving the overall capability to configure eighty one different processes.

Test Set Up Task

The next step to be performed is the TEST SET UP step. The engineer positions the pointer in the CON- FIGURATION menu region to the process selected for test setup and then touches EXIT and the MAIN MENU reappears on the screen (Table 13). The pointer under ITEM is then moved to TEST SET UP and the GO box touched. The system responds by displaying a test set up screen as shown in Table 19. The prompt/information line at the top of the display indicates the particular process group and individual process being worked on in this step so the engineer has no confusion as to the parameter configuration which is pertinent to that test.

The test setup screen enables two very important functions to be performed by the engineer; (1) denoting each of the parameters as having one of three types of status, namely operator unalterable (fixed value), operator alterable (common default value), or forced entry (operator must enter to enable process running); and (2) entering fixed parameters and default values for operator alterable parameters. It should be noted that the parameter names in the PARAMETER region are predefined relative to the process control program (CONTOUR MAP in this case) associated with the specific process being set up. The engineer may not alter these in this example. It should be recognized, however, that the engineering control program may be configured, if desired, to permit addition of optional data type parameters by the engineer.

To perform the test set up, the engineer positions the cursor or pointer at each item in the VALUE column, touches CHANGE, and then either types in a value or toggles the item through preset choices for each parameter, using the up/down cursor control keys. For example, the NUMBER OF SITES parameter has a fixed set of optional values which must be toggled through (e.g., by using the down cursor key, or pressing the CHANGE box, until the desired value is selected). After the parameter value is set or entered, the pointer is moved to the OPTION column by using the rightward cursor movement key and the desired status of the parameter is denoted by toggling through the three choices of LOCKED (fixed and unalterable), MAY CHANGE (operator alterable), and FORCED (operator must enter). It should be noted that, wherever necessary or desirable, each of the process parameters which requires entry by the opeerator is subjected to a validity check, such as for example, the entry of a valid date or wafer identification. The engineer could be permitted as a supplemental test set up function to establish a particular format and/or other constraint for the parameter value or date to be entered.

This test setup must be done for every one of the configured processes by selecting the process using the screen in Table 15 and then invoking the TEST SET UP function from the MAIN MENU. While this is a time-consuming task, it is one which is very easy to perform in a straightforward manner using the friendly tools which are incorporated in the engineering set up program.

Header Set Up Task

After TEST SET UP has been done, the engineer can similarly do a HEADER SET UP for each of the configured processes by invoking the HEADER SET UP from the MAIN MENU and using the screen shown in Table 21. The first line is typically a LOCKED descriptive title, and the other lines in the header may be data lines whose names and status are configured at the total discretion of the engineer.

Operator Choices Task

After the HEADER SET UP has been done for each configured process, the final configuration step of OPERATOR CHOICES is performed, starting with invoking this task from the MAIN MENU. This task is carried out using the menu shown in Table 18, which corresponds generally to the menu configured by the engineer in the OPERATOR PROMPTS task. However, the task now is to denote each of the process groups and/or individual processes as available or unavailable. All processes default to unavailable and the engineer must actively enable each process group and each process which he wants to be available to the operator. This is simply done by positioning the pointer at the process group name under TITLE and/or process name under CONFIGURATION and touching the SELECT box. The selected (enabled) processes will be highlighted in reverse video (denoted with an asterisk in the Table)). The engineer can thereby enable and disable each process group and individual process at will. Of course, if a process group is disabled, all of the individual processes in the group are automatically disabled since the operator cannot select that group.

In the case of the operator example discussed above (see Tables 6 and 8), the engineer has enabled the first three group (implanter) process names and, for the EXTRION DF4 group, the first three configured processes under CONFIGURATION have been enabled. For the NOVA NV10-1 group (see Tables 7 and 18), only the first two configurations were enabled. This can be changed at any time by the engineer as will be discussed later.

When the engineer is finished with his other configuration tasks, he will typically update all changed data structures by invoking UPDATE ALL from the MAIN MENU. This will write all of the new or revised data structures onto the operator disk then entered into the system and thereby give an operator related configuration to that disk which can easily be changed.

From the above discussion, it should be apparent that the system and method of this invention provides to the engineer all of the advantages discussed in the introductory section of this specification. Specifically, with respect to the use of the invention in connection with setup of an automated resistivity tester, it should be apparent that the engineer is provided with tools to easily and conveniently set up multiple test process configurations, each with individual parameter status denotion and availability denotion. The results of all of this setup effort are stored in associated data structures and not on a collection of documents which can get lost, garbled or misinterpreted.

Furthermore, the engineer can, at will, revise any of the configured test processes in a machine editing approach by direct revision of data structure values rather than dealing with revising process instructions on paper. If the engineer wishes to maintain records of the prior configurations, these could be stored on one of the operator-related disks, but with all process groups disabled so that the disk cannot be mistakenly used by an operator. This, in itself, eliminates the "paperwork confusion" that often surrounds process revision level documentation and the mistakes that can be made by an operator who uses an obsolete version of written process instructions. If the engineer proceeds carefully with use of the tools provided by the system and method of this invention, all of the operator-related disks will only have enabled process configurations which are current and correct.

While the system and method of this invention does not avoid the time consuming task of setting up multiple test processes, once the engineer has learned to use the tools provided by the system and method of this invention, the engineering setup tasks can be performed much more efficiently and effectively. By eliminating the drudgery of maintenance of documentation and providing the convenience and confidence engendered by use of the system and method of this invention will encourage more widespread, effective use of computer controlled testing.

With the understanding provided by the above description of the operator use of the operator control program of this invention for running processes and the engineering setup procedure used by the engineer, the description below of the detailed process flow of the invention will be more readily understood. The system and method of this invention involves, for both the operator control program and the engineering setup program, a series of routines which will be described below in connection with FIGS. 5-20 of the drawings.

Overview of Method of This Invention

Figure 5:
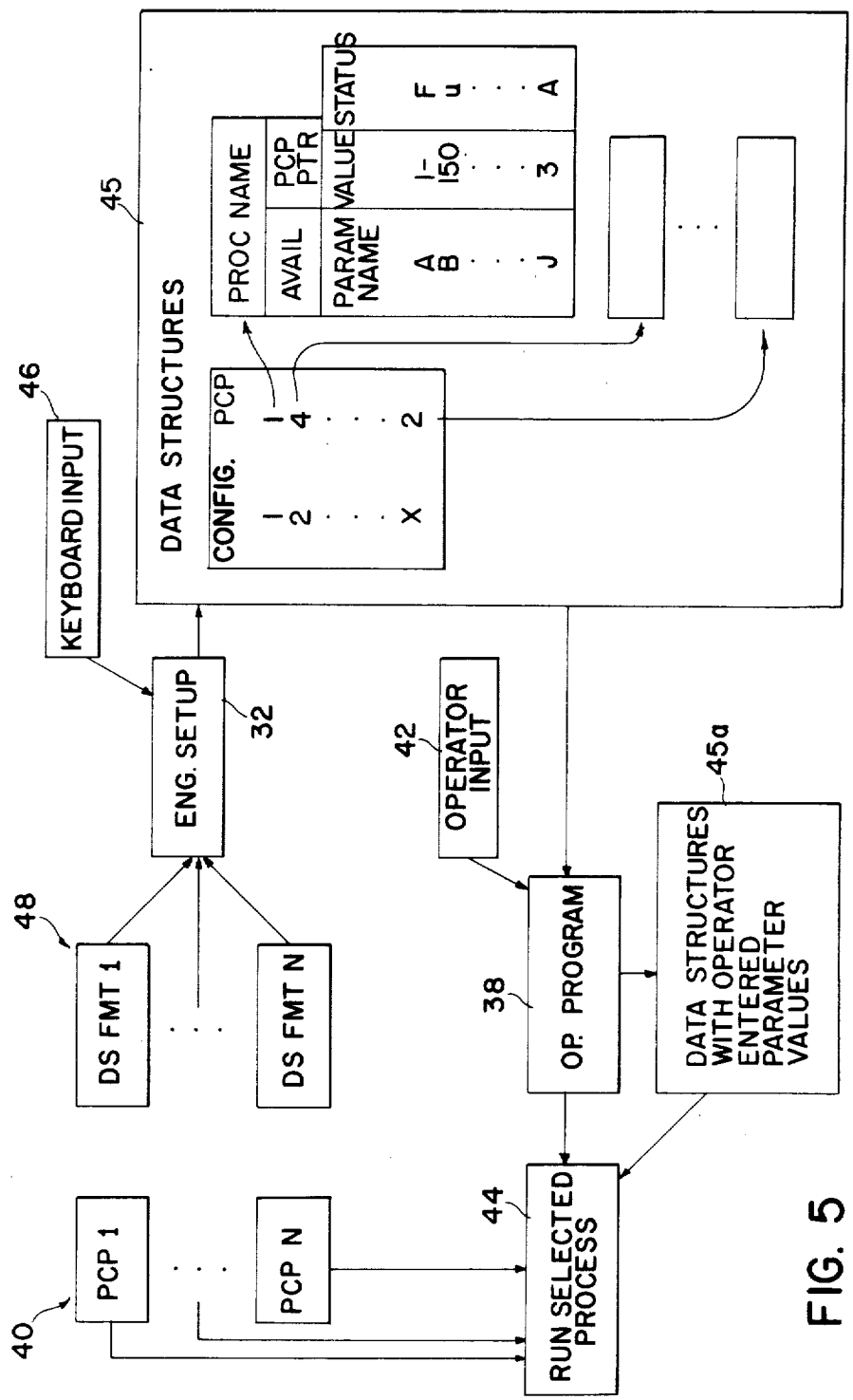
FIG. 5 is a conceptual diagram of the method of this invention.

Referring to FIG. 5, there is shown a flow diagram of the general concept of the method of this invention. The method begins with the tasks performed by the engineering set up program 32 and ends with tasks performed by, or initiated by, the operator control program 38. For ease of understanding, the operator control portion of the method will be described first.

The operator program 38 responds to commands from an operator (operator input 42) to select the process to be run on the tester 22. Next, the operator program 38 allows the operator to enter parameter values needed for running the selected process. These parameter values, along with other predefined parameter values, are stored in the memory of the computer. Furthermore, the parameter values for any specified process, along with other related informtion which will be described below, are organized in the memory of the computer by the use of data structures 45a.

There is an important distinction between a "process control program" and a "process". A process control program is a computer program which is used to direct the system 22 to perform a certain type of process. A process, on the other hand, is an operation performed by the system 22 under the control of a specified process control program in accordance with a specific set of parameter values.

As will become clear from the discussion below, a process can be represented by a data structure which specifies the process control program to be used and the parameter values to be used therewith. Furthermore, a number of such data structures for different associated processes can be stored in a computer at one time. This feature is a central aspect of the present invention. The preferred embodiment of the present invention uses a number of data structures which will be discussed in detail below.

After the operator has entered all the parameter values needed to run a selected process, the selected process can be run 44. The specified process control program 40 is given parameter values from the appropriate data structure 45a and uses those values to determine the specific command signals to be sent to the tester system 22.

Returning to the beginning of the method, the engineering set up control program 32 is used to build data structures 45 which specify processes to be run under the control of the operator control program 38. The data structures are typically built in response to instructions from an engineer (keyboard input 46).

Since each process control program may need a different set of parameters, and since the manner in which those parameters are organized will generally vary from one process control program to another, the format of the data structure used to define a process will generally depend on the process control program for the process. More succinctly stated, the format of each data structure is determined by the prameters needed by the corresponding process control program. Thus there is a data structure format 48 for each process control program.

As shown in FIG. 5, the data structure for each process includes certain information: the name of the process (Op Prompt); a flag value indicating whether use of process by the operator control program is enabled (Avail); a pointer to the process control program for the process (PCP ptr); and a list of the parameters for the process. For each parameter there can be stored a value and a status flag. The status flag is used to indicate if the parameter value is a fixed and not changeable by the operator control program; alterable by the operator control program; or must be given a value by the operator control program before the process can be run.

In the preferred embodiment the data structures 45 generated by the engineering set up programs are stored on a disc 35 for later use by the operator control program 38. The discs 35 used with the HP 150 computer in the preferred embodiment are microdiskettes (i.e., miniature, portable flexible discs) capable of storing approximately 750,000 bytes of data, and thus are capable of storing a large number of data structures in addition to data collected while running the wafer resistivity tester 22. The terms "disc" and "microdiskette" are used interchangeably herein.

When the operator control program 38 is used it reads in and stores a copy of these data structures from the disc 35. Operator entered parameter values are temporarily stored in a copy of the data structure 45a for the process being used, and thus do not affect the copy of the data structures 45 stored on the disc 35. In fact, the operator control program 38 is incapable of changing the data structures stored on the disc 35.

As in the above description of the general aspects of the method of this invention, for the sake of clarity, a detailed description of the operator control module will given before describing the engineering set up module and the data structures used by this invention.

Initial Steps of Method

Figure 6:
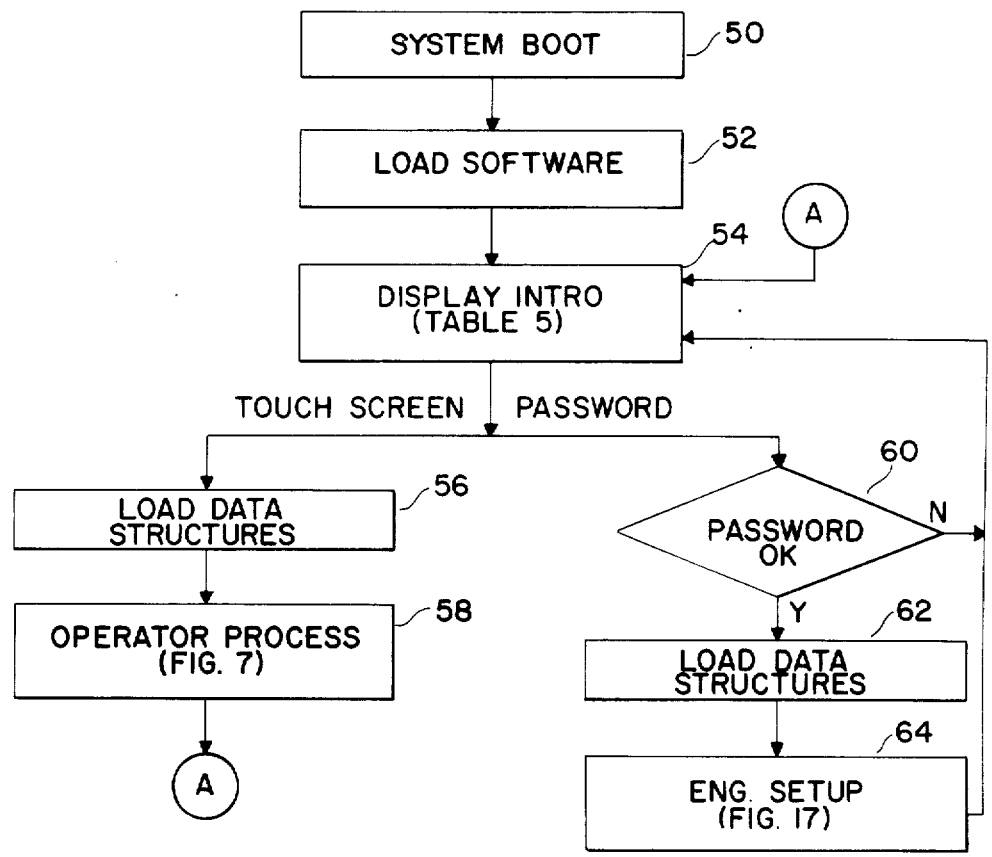
FIG. 6 is a flow chart showing the initial steps of the preferred method embodiment of this invention.

Referring to FIG. 6, there is shown a flow chart illustrating the initial steps of the method of the preferred embodiment. These are the steps by which the engineering set up and operator control programs are started.

When the computer 30 or 36 in either the engineer module 26 or operator module 28 is turned on, it automatically goes through a standard system boot procedure 50. This loads in the computer's operating system software and also loads in (box 52) and starts up a designated program, which in this case is the introductory sequence of the main program module.

Thus when the computer 30 or 36 is turned on, or reset, it automatically loads in the software for the control system 24 and a predefined display screen (see Table 5) appears on the computer's display 34. In the preferred embodiment, the introductory screen identifies the system, displays a copyright notice, and warns the user that use of the system 24 is subject to the terms of a license agreement.

Note that entry point A to the introductory display step (box 54) is referred to in the following Figures as a short hand notation for returning to this portion of the system start up procedure. Similarly, other entry point designations (e.g., B, C and D) are used consistently from one Figure to the next to shown the flow of control from one portion of the software in the system to another.

From the initial screen, either the operator control software or the engineer set up software can be activated. If the display screen 34 of the computer is touched, the operator control software is activated. This is done by loading into the computer's memory a copy of the data structures (box 56) stored on a disc 35, and by starting the operator process (box 58).

It should be noted that in the preferred embodiment, the computer's display 34 is a touch sensitive screen. Thus the computer can detect not only that the screen 34 has been touched, but also generally the position on the screen where it was touched. As will be seen later, the preferred embodiment of this invention uses this touch screen feature in a number of places to facilitate use of the system 24 by operators. Since such touch sensitive screens are well known in the prior art, this feature of the preferred embodiment needs no further explanation. However, it should be understood that the input signals from the touch sensitive screen 34 could easily be replaced by keyboard signals or signals from a mouse device or light pen device in alternate embodiments of this invention to be discussed below.

Still referring to FIG. 6, the engineer set up process is started by entering a password on the keyboard 33 instead of touching the screen 34. If the password entered is correct (box 60) the engineer set up software is activated. This is done by loading into the computer's memory a copy of the data structures (box 62) stored on a disc 35, and by starting the engineer set up process (box 64). If the password entered is not correct (box 60) the introductory display screen continues to be displayed. An error message is temporarily displayed in the prompt line at the bottom of the screen.

Operator Control Process

Figure 7:
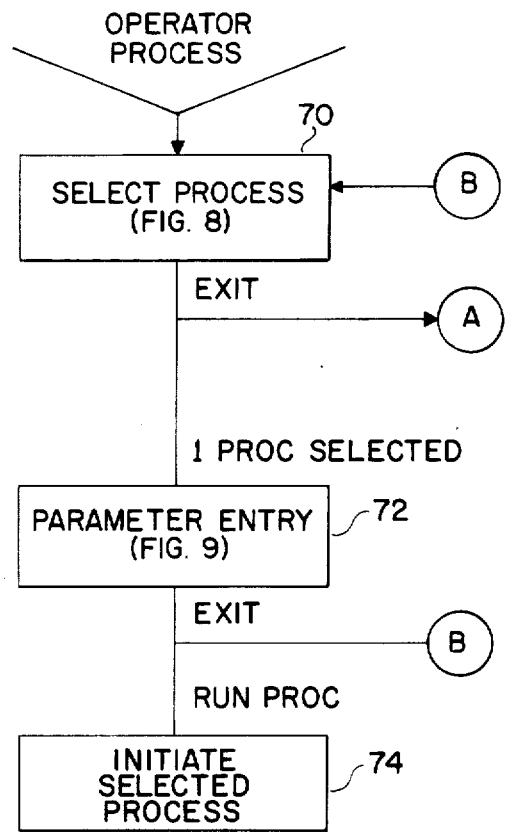
FIGS. 7 through 9 are flow charts of the operator control program of the preferred embodiment of this invention.
Figure 8:
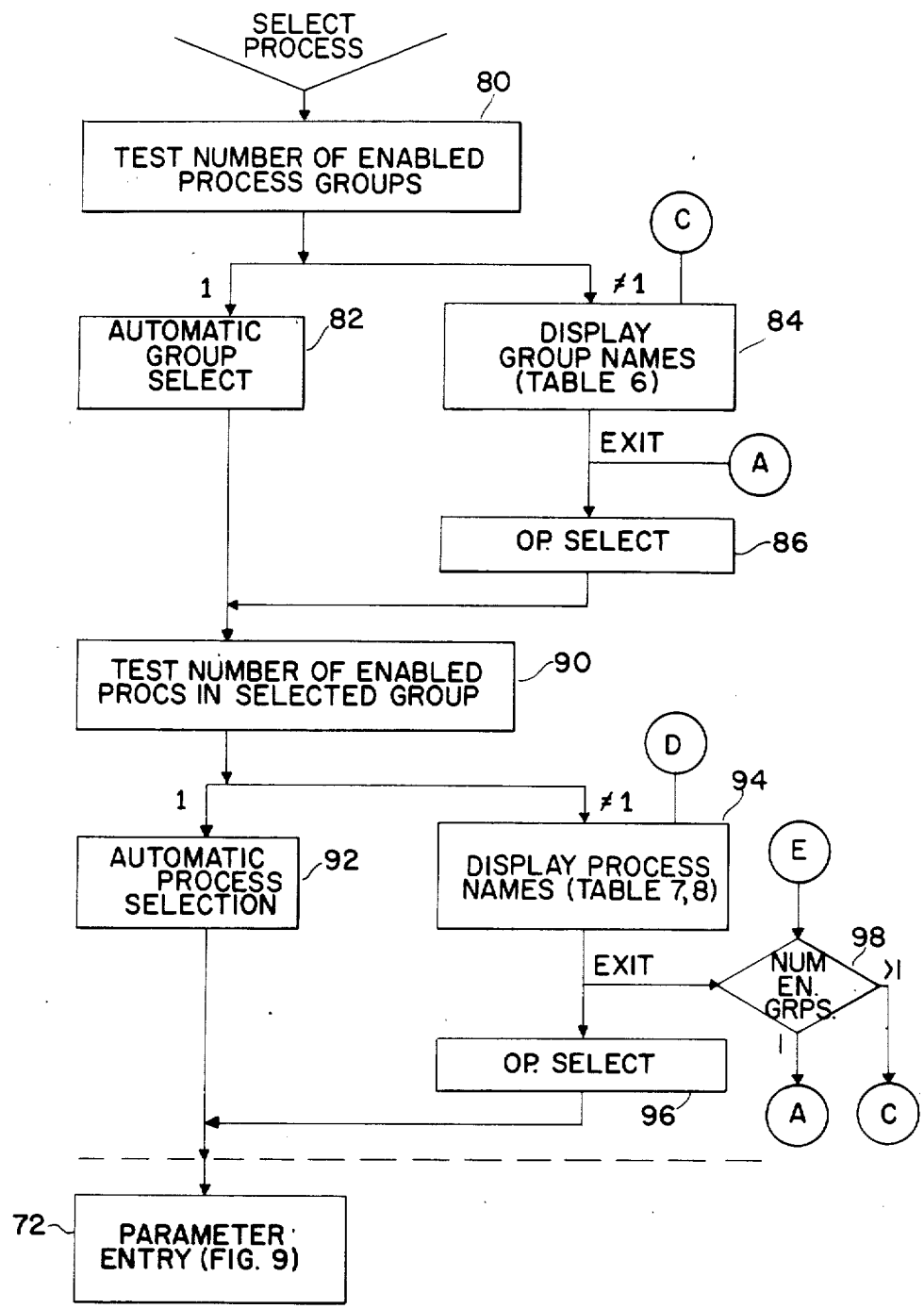
Figure 9:
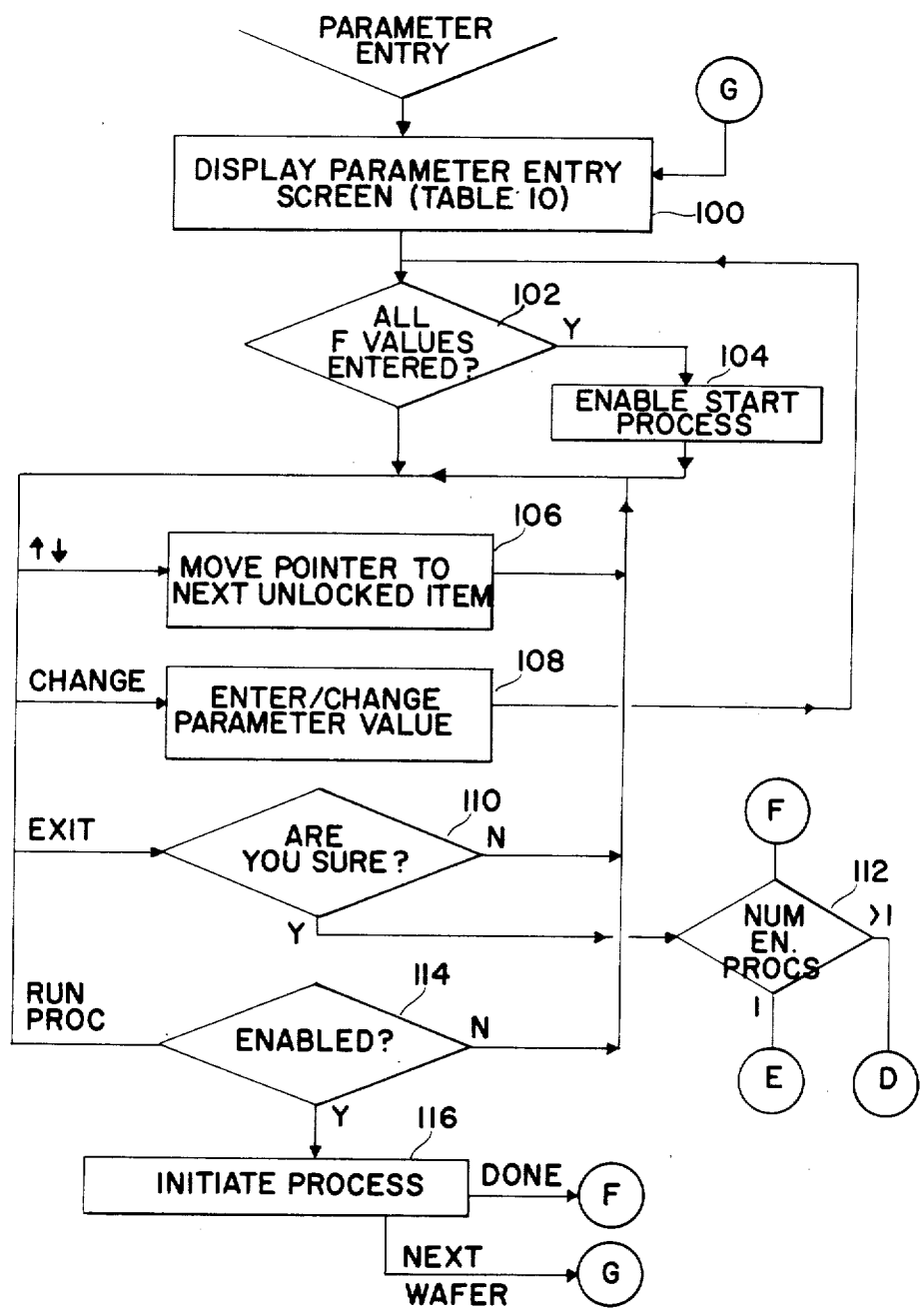

Flow charts for the operator control program are shown in FIGS. 7 through 9.

Referring to FIG. 7, the basic steps of the operator control program are selection of a process (box 70) to be run on the tester 22; entry of parameter values for the process (box 72); and initiation of the selected process (box 74).

At each step of the operator control process, the operator can exit from the current step and return to the previous step of the method. Thus, the operator can touch an EXIT box on the display 34 while in the select process step (see Table 6) to return to the introductory display step (box 54) shown in FIG. 6. Similarly, the operator can touch an EXIT box on the display 34 while in the parameter entry step to return to the process selection step.

Also, as discussed above, when the operator control process is started the data structures for eighty one predefined processes are copied from a disc into the computer's memory for use by the operator control module 28. These predefined processes are organized into nine groups of processes, and each such group contains nine processes.

Operator Process Selection

Referring to FIG. 8, the first step of the process selection method is to determine how many process groups are available for use by the operator (box 80). If only one is available, that group is automatically selected (box 82).

If either none or more than one process is available, the process selection step proceeds by displaying a screen such as the one shown in Table 7. The items in the middle of the screen each represent a group of predefined processes. Those which are available for use by the operator are shown in reverse video, shown in Table 6 as being between double horizontal lines. Those which are not available to the operator are shown in normal video, shown in Table 6 as being between single horizontal lines. Thus, in Table 6, the EXTRION DF4, EXTRION CF3000, and NOVA NV10-1 process group are available, while the NOVA NV10-2, and LINTOTT IIIX process groups are not available.

Group selection (box 86) is performed by touching an available group name on the screen 34. Pressing the touch screen display 34 at the position of an unavailable process group causes the operator control program to generate a beep, and to leave the display unchanged. On the other hand, touching the display 34 at the position of an available process group causes a new display to be shown, such as the displays shown in either Table 7 or Table 8.

The display of unavailable group names is often useful because of the contextual information provided. Additional contextual information is provided at the top of the display, where the name of the procedure being performed is shown.

Selection of the EXIT option returns the operator to the introductory display by way of entry point A.

Selection of the HELP option at this or any other point of the process causes the temporary display of an explanatory statement eleminate any use confusion.

If none of the groups are enabled (i.e., available for use by the operator), the names of the groups are displayed, but the only active option available is the EXIT option. The display of the group names, even though none are available, is mostly useful for an engineer checking the display of group names for the processes he is setting up.

Once a group has been selected, the selection process proceeds by checking the number of available processes in the selected group (box 90). If only one is available, that process is automatically selected (box 92). Otherwise (i.e., if either no process or more than one process is enabled), the process selection step proceeds by displaying a screen such as the one shown in Table 7. Table 7 shows the process names displayed if the NOVA NV10-1 group is selected. Table 8 shows the proces names displayed if the EXTRION DF4 group is selected. Referring to Table 7, the items in the middle of the screen each represent a predefined process. Those which are available for use by the operator are shown in reverse video, shown in Table 7 as being between double horizontal lines. Those which are not available to the operator are shown in normal video, shown in Table 7 as being between single horizontal lines.

As described above with respect to group selection, process selection (box 96) is performed by touching an available process name on the screen 34. The process then proceeds to the parameter entry routine (box 72, see FIG. 9).

Alternate Group and Process Selection Method

It should be understood that in an alternate embodiment of this invention a dynamic menu could be used in the operator control program to select the process to be run on the tester. In that approach the process group names would be displayed in the first menu display region. The process names corresponding to the group name being pointed at in the first menu display region would be displayed in the second menu display region. Furthermore, the availability of the groups and processes would be visually indicated by displaying the names for available groups and processes in reverse video.

The operator would select a process by first moving the pointer in the first menu display region until it pointed at the group he wanted to select. The pointer movement could be controlled by the operator control program so that the pointer skips over groups which are not available. As that pointer is moved, the process names in the second menu display region would be automatically replaced with those for the group then being pointed at. Then the operator would move the pointer in the second menu display region to point at the process he wanted to select. Once again the pointer movement could be controlled so that it skips over processes which are not available. Finally, when the pointer in the second display region is pointing at the process the operator wants to select, he would touch an appropriately labelled box (e.g., SELECT) on the screen to select that process and to move on to the parameter entry step.

Selecting the EXIT option shown in Table 7 returns the process to the group selection step, via entry point C, if more than one group is available; otherwise the process proceeds, via entry point A, to the introductory display step (see box 98).

While the processes shown in Tables 6 and 7 are grouped in terms of the ion implanter being used, it should be understood that processes can be grouped in any manner that the engineer wants.

Operator Parameter Entry

Referring to FIG. 9, the parameter entry routine begins (box 100) by displaying a parameter entry screen such as the one shown in Table 10. The top line of the screen notifies the operator that he/she is being asked to enter parameter values; it also identifies the name of the process and process group selected and the name of the process control program corresponding to the selected process. In the example shown in Table 9, the selected group is the NOVA NV10-1 MAP group, the selected process is called 1E13-BORON (MAP), and the name of the corresponding process control program is CONTOUR MAP.

The lines just below the top prompt line, on the left side of the screen, are called header lines. Below the header lines are a list of parameters and their values.

Header lines and parameter values which are fixed in value, and can not be changed by the operator are shown in normal video on the screen. Those header lines and parameters which can be may be changed by the operator are shown in normal reverse video (shown with a single asterisk "*" next to the item in Table 10). Finally, the header lines and parameters which must be given a value before the selected process can be run are shown in bright reverse video (shown with two asterisks "**" next to the item in Table 9).

A movable pointer (shown as a leftward pointing arrow in Table 9) is used (box 106) to indicate the parameter or heading line which is currently selected. In the preferred embodiment, the moveable pointer automatically skips over header lines and parameters with fixed values.

A value for the currently selected line or parameter can be entered by touching the CHANGE box on the screen and then using the operator keyboard 37 to enter an appropriate value (box 108). As described above with reference to the prior art Omnimap system, some parameter values are entered by typing in a value on the operator keyboard 37 while others are selecting from a predefined set by using a cursor movement key (such as the left or right movement cursor key).

After each parameter entry (box 108) (and also when the parameter entry screen is first displayed), the system checks to see if values have been entered for all forced entry parameters (shown in bright reverse video). If so, the running of the selected process is enabled and a box at the bottom of the screen is labelled START or RUN TEST. If there are no forced entry head lines nor parameters, then the running of the selected process is enabled when the parameter entry screen is first displayed. Also, in the preferred embodiment, when a value is entered for a forced entry parameter or header line it is thereafter shown in normal reverse video instead of bright reverse video. Thus the operator is visually cued as to the remaining forced entry parameters.

Selecting the EXIT option aborts the parameter entry process. First (box 110), the operator is asked if he really wants to exit by displaying the question "ARE YOU SURE THAT YOU WANT TO EXIT?", or something of the like, on the bottom prompt line. The text in the bottom four boxes on the screen is replaced so that one say YES, on say NO, and the others are blank. If the operator touches the screen at the NO box, the parameter entry process resumes. If he touches the YES box, the parameter entry process aborts. In this case, the process resumes at the process selection step if more than one process in the selected group is available (box 112); otherwise the process resumes at either the group selection or introductory screen steps, depending on the number of available process groups (see box 98 in FIG. 8).

Once all forced entry parameters have been given a value (see decision box 114), the START option (also called the RUN TEST or RUN PROC option) initiates the running of the selected process (box 116). Once the selected process starts, the corresponding process control program takes over the computer. Thus it may change the display, ask the operator questions, request that he set various dials on the tester 22, and so on. In the preferred embodiment all tester 22 adjustments are performed automatically by the system and do not require manual intervention by the operator.

When the selected process is done, the parameter entry screen reappears and the bottom option boxes are labelled NEXT WAFER and DONE (equivalent to EXIT). If NEXT WAFER is selected by the operator, parameter entry is enabled again. In the preferred embodiment, the parameter and head line values used in the previous test are used as the starting values for the next test run because this is often convenient for the operator. If the DONE option is selected the process returns via entry point F to decision box 112 to one of the earlier points in the operator control process, depending on the number of available processes and/or groups.

In summary, the operator control process allows the operator to select any available process. It allows him to enter parameter values for operator changeable parameters and forces him to enter values for forced entry parameters. When values have been entered for all forced entry parameters, the running of the selected process is enabled.

Now that the operator control process has been described, the process of defining a system for setting up the use of such an operator control process will be described. First, however, some related hardware features of the preferred embodiment and the general aspects of the dynamic menu feature will be discussed.

Bit Mapped Display Service Routines

The preferred embodiment employs an HP 150 computer which uses a bit mapped display. The bit mapped display facilitates quick writing of new images on the computer's display 34 and is especially useful in rewriting selected portions of the display. Furthermore, while the display is a monochrome display, it is capable of three levels of illumination: dark, light and bright.

As is now standard for many computers, the HP 150 has built-in firmware routines for controlling its display. The important characteristics of the HP 150 display firmware programs are as follows.

First, any portion of the screen can be rewritten merely by specifying a screen position and the text or picture (such as a line or box) to be written there. Second, text can be specified to be written in normal video, reverse video, or bright reverse video (also called highlighted). Third, the routine are fast in that the response time is virtually unnoticeable to the user.

The inner workings of the bit mapped display and the display routines are well known to those skilled in the art. Since these details are of no import to this invention, they are discussed no further herein.

Dynamic Menu Selection Method

In order to show the full capability of the dynamic menu feature of this invention, an example is used which is different from that used in the preferred embodiment. The uses of the dynamic menu feature in the preferred embodiment are explained below with reference to the MAIN MENU, OPERATOR PROMPT, and OPERATOR CHOICES tasks in the engineering set up program.

Figure 19:
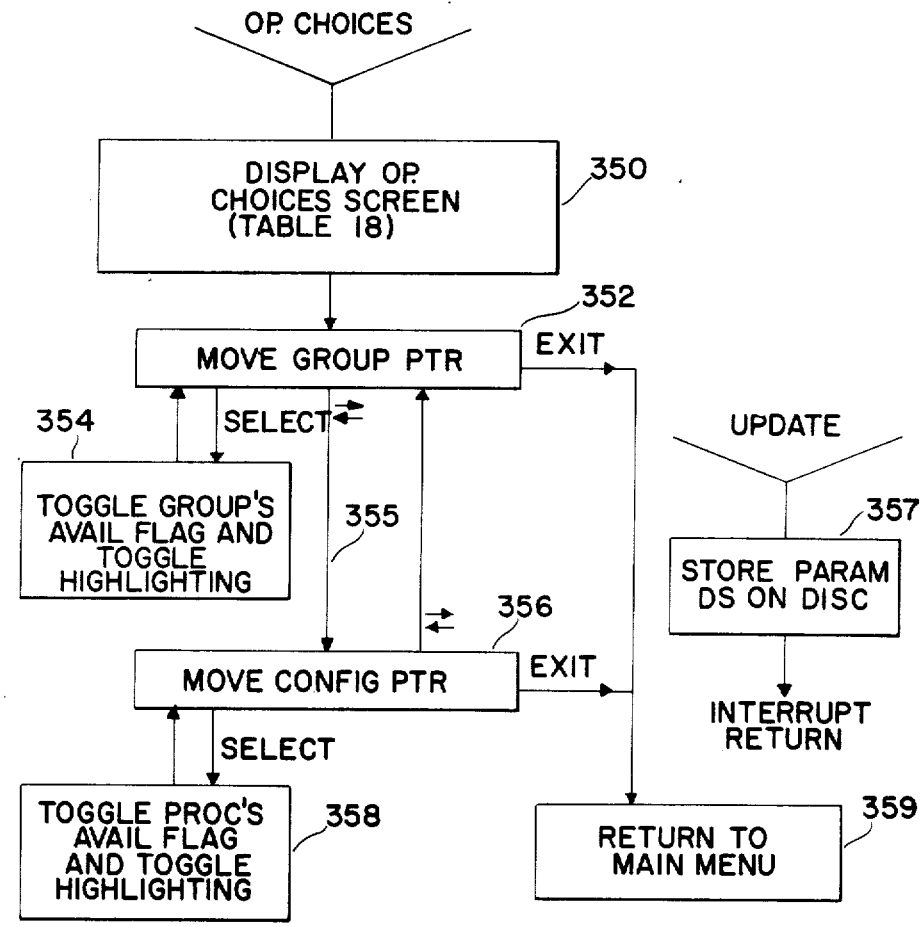

Referring to FIG. 19, consider the exemplary menu display in Table 10. The exemplary menu display is to be used to select one item from a set of items. The items are organized into groups and subgroups, each of which has an assigned name. For the purposes of this example, and to show the generality of the dynamic menu feature, the items are objects to be made by a lathe under the control of a microcomputer, each group is named after a particular customer, and each subgroup represents either a particular division of the customer or a particular project of the customer for which certain objects must be manufactured. Other examples of the dynamic menu selection method of this invention will be shown with reference to the engineering set up process, described in detail below.

Three menu display regions are defined on the display screen: a group menu, a subgroup menu, and an object menu. A fourth region is used to identify the process control program associated with each item shown in the object menu.

There is a pointer associated with each menu region and also with the process type region. The current position of each pointer is indicated by displaying the item in reverse video (shown in Table 10 as an asterisk "*" next to the selected position).

The sub-groups shown in the second menu region are the subgroups which are associated with the group being pointed to in the first menu region. The object names shown in the third menu are the objects associated with the subgroup being pointed to in the second menu region.

Only one of the position pointers is active at any one time. The active pointer is shown by displaying the title of the corresponding menu in reverse video (shown in Table 10 with an asterisk "*" next to the title) and by displaying the item being pointed to by the active pointer in bright reverse video (shown in Table 11 by an arrow pointing to the item in bright reverse video). The left and right cursor movement keys on the keyboard 33 are used to move the active pointer from one menu to another, and the up and down cursor keys are used to move up and down the list of items in any one menu.

When the menus are first displayed, they begin with the active pointer pointing at the first group name, and with the other pointers pointing to the first item in each menu.

As shown in Table 11, when the pointer in the first menu region is moved, for instance, to point to the second item in the menu, the subgroup menu is automatically replaced with subgroup items associated with the group item being pointed to in the first menu region. Similarly, the third menu region is replaced with object names associated with the new subgroup item being pointed to in the second display region; and the fourth display region is replaced with the process names associated with the new object names shown in the third menu display region.

Table 12 shows the display after the active pointer has been moved to the second display region and has been moved down to the third item in the subgroup menu.

When the SELECT box on the screen is touched, the process corresponding to the object currently being pointed to in the object menu is "selected". Depending on the circumstances, this might be used, for instance, to select a process for engineering set up. In another example of the dynamic menu selection method, the item (whether a group, subgroup or object) being pointed to by the currently active pointer is denoted as available or nor available for use by the operator when the SELECT box is touched.

When the CHANGE box on the screen is touched, the name of the item being pointed at by the active pointer can be changed by typing in a new name on the computer's keyboard.

Referring to Table 12, in the preferred embodiment the process control program to be used with a specified process (i.e., item in the object menu) can be changed by moving the active pointer to the specified item in the object menu and then moving the active pointer to the right over to the Type menu. When the CHANGE box on the screen is touched, the engineer is prompted to select one of the available process control programs. This process will be explained in greater detail when the operator prompt set up process of the engineering set up process is described below.

Figure 10:
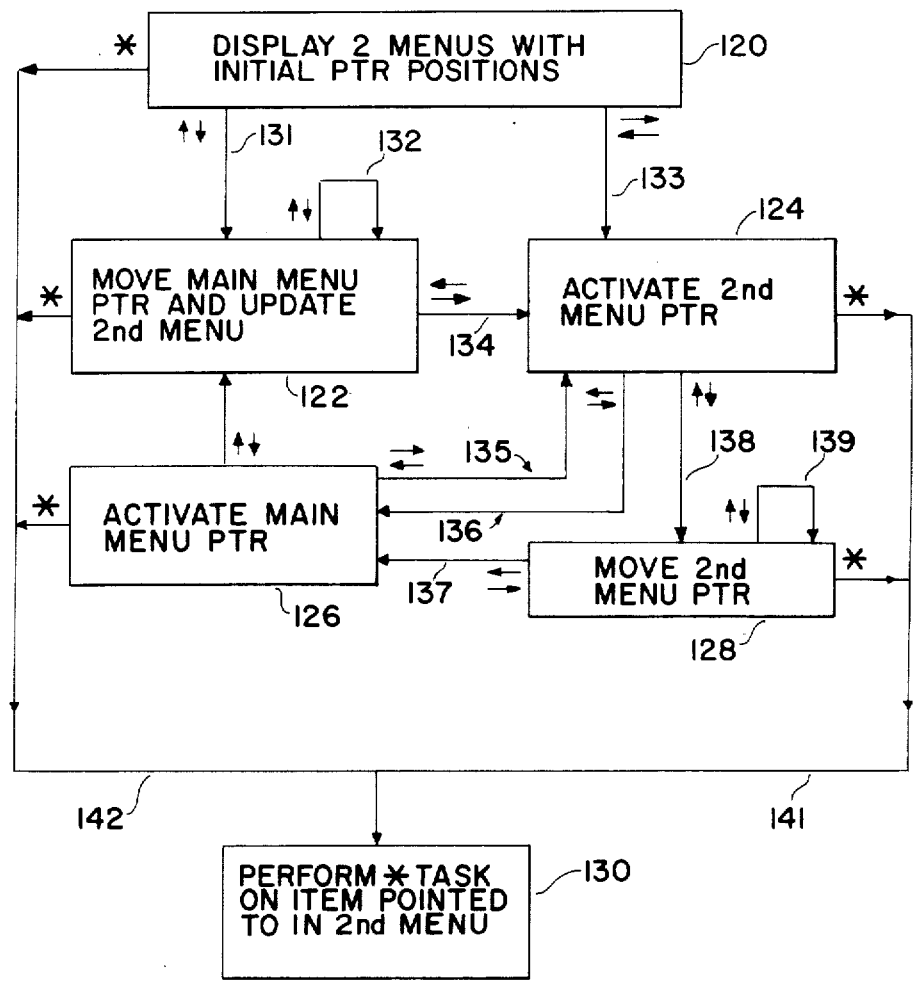
FIGS. 10 and 11 are flow charts of the menu selection method of this invention.

Referring to FIG. 10, the basic menu selection method works as follows. First, at least two menu display regions are defined and two menus are displayed with predefined initial pointer positions (box 120). For instance, in the dynamic menu example shown in Table 10 there is a first menu display region entitled GROUP and a second menu display region entitled SUB-GROUP. Each display region has a pointer, the position of which is indicated in Table 10 by an asterisk. In some, but not all, uses of the dynamic menu in the preferred embodiment the items being pointed at by the display region pointers are shown in reverse video.

Up and down cursor keys (see process flow paths 131 and 132) are used to move the main menu pointer, which automatically causes the second menu to be replaced with items corresponding to the main menu item currently being pointed at (box 122). See for example the transition from Table 10 to Table 11. Process flow path 132 represents successive movements of the main menu pointer.

Successive uses of the left and right cursor keys (process flow paths 133-137) activate the second menu pointer (box 124) and then the main menu pointer (box 126). Each such movement of the active pointer from one menu display region to another is visually confirmed by highlighting the title of the display region with the active pointer. In some, but not all, uses of the dynamic menu in the preferred embodiment the active pointer is further distinguished by showing the item being pointed at by active pointer in bright reverse video while the items being pointed at by the other display region pointers are shown in normal reverse video. The activation of the second menu pointer in Table 12 is shown by the movement of the asterisk from the title of the GROUP menu (in Table 11) to the title of the SUB-GROUP menu (in Table 12). From the screen shown in Table 12, use of the left cursor would activate the first menu pointer and deactivate the second menu pointer.

When the second menu pointer is active, up and down cursor keys (process flow steps 138 and 139) are used to move the second menu pointer. Thus, the screen shown in Table 12 was achieved by activating the second menu pointer and then using the down cursor key twice to move the pointer down to the third item in the second menu display region.

At any time, a designated task can be performed with reference to either the item pointed to by the active pointer or by the second menu pointer by sending an appropriate signal to the computer (see box 130 and process flow paths 141 and 142). For instance, pressing the SELECT box on the screen shown in TABLE 12 could be used to enable the sub-group being pointed to (PROJECT X) for use by the operator control program.

Figure 11:
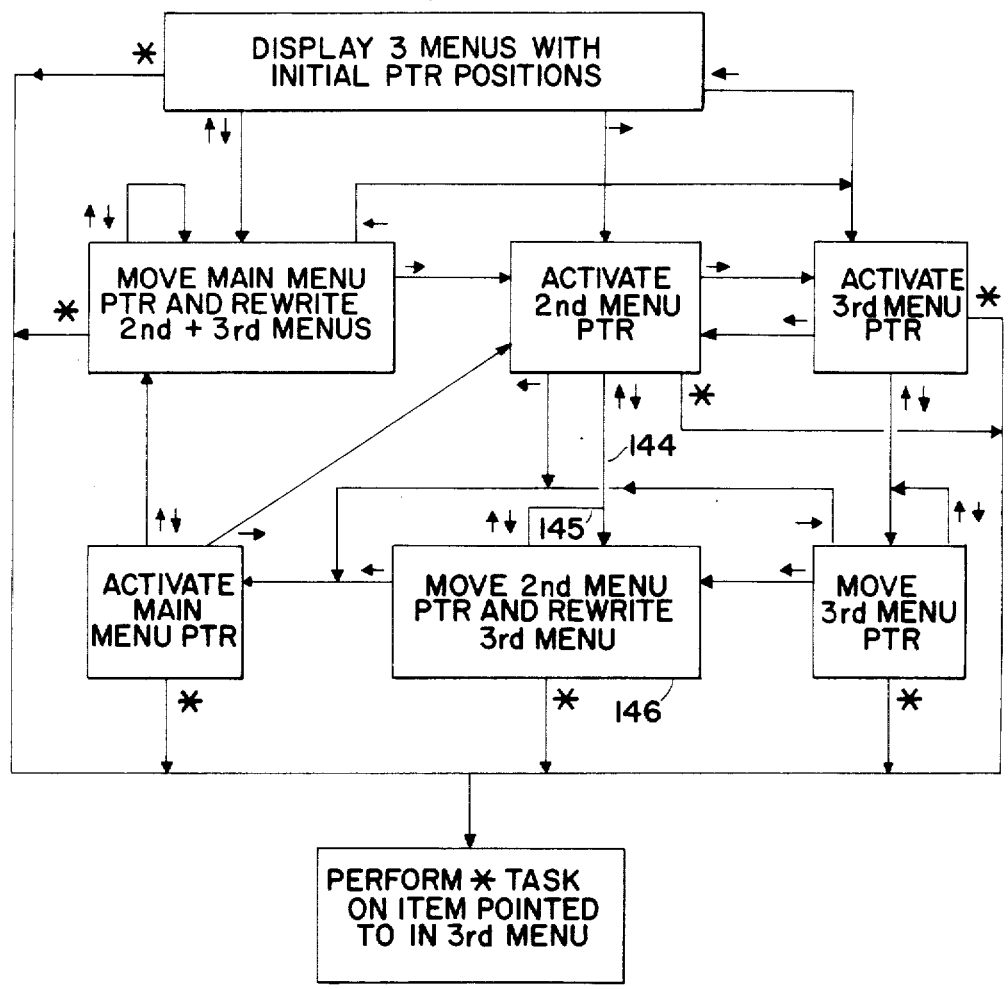

Referring to FIG. 11, there is shown a flow diagram for the menu selection method using three menu display regions. Since this is an expanded version of FIG. 10, only the additional features need to be described.

The primary additional feature is that up and down movements of the pointer in the second display region (see flow paths 144 and 145) cause the third menu display region to automatically be replaced with items corresponding to the second menu item currently being pointed at (box 146). See, for instance, the transistion from Table 11 to Table 12. Also, up and down movement of the pointer in the first menu display region causes both the second and the third display regions to be rewritten. For an example, see the transistion from Table 10 to Table 11. The third display region is affected because the contents of the third display region must correspond to the item currently being pointed to in the second display region, which is changed by movement of the pointer in the first display region.

The other additional flow paths found in FIG. 11 which are not in FIG. 10 represent the additional lateral movements of the active pointer from display region to display region which are made possible by the inclusion of a third dynamic menu display region.

The above-described dynamic menu selection method can be expanded for use with four or more simultaneously displayed menus. For instance, the dynamic menu selection method could be used with simultaneously displayed menus for (1) each state in the U.S.; (2) each county in the currently selected state; (3) each city or unincorporated town in the currently selected county; and (4) each precinct or equivalent division in the currently selected city.

Movement of the pointer in any menu would cause the menus lower in the hierarchy to be replaced with lists corresponding to the new item being pointed at. Also, in this example, it would be necessary to show only a portion of each list because the lists in each display region would be too long for most display devices. Thus a feature of such an embodiment would be a scroll or paging function for scanning through all the items in any one display region.

Alternative Pointer System

In other embodiments of the dynamic menu aspect of this invention, a mouse device or light pen could be used to manipulate the display region pointers instead of the cursor keys used in the preferred embodiment.

A mouse is generally a handheld position sensitive device that is connected to a computer. When the mouse is moved along the surface, for instance, of a desk, a cursor or similar pointer on the computer's screen follows the movement of the mouse. Using visual feedback, the user can quickly move the mouse so that the pointer on the screen is at any desired position. Furthermore, such mouse devices usually have two or more function buttons. These buttons could be used, in the context of the dynamic menu aspect of this invention, to indicate when a display region pointer is to be moved to the item currently being pointed at by the mouse.

A light pen is generally a light sensitive pointing device which can be used to detect which position on a computer's display is being pointed at. Thus a light pen could be used to move display region pointers in a dynamic menu simply by programming the system to move the appropriate display region pointer when the user points the light pen at a new item in any of the dynamic menu display regions.

Data Structures

Figure 14:
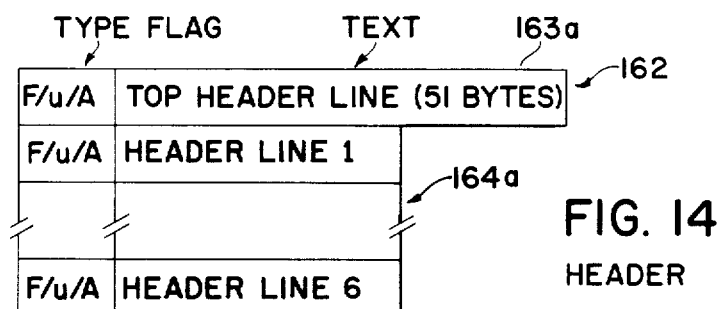
Figure 14:
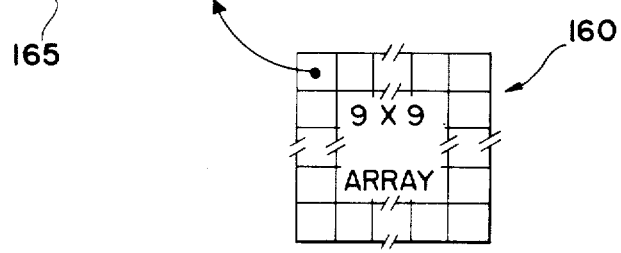
Figure 15:
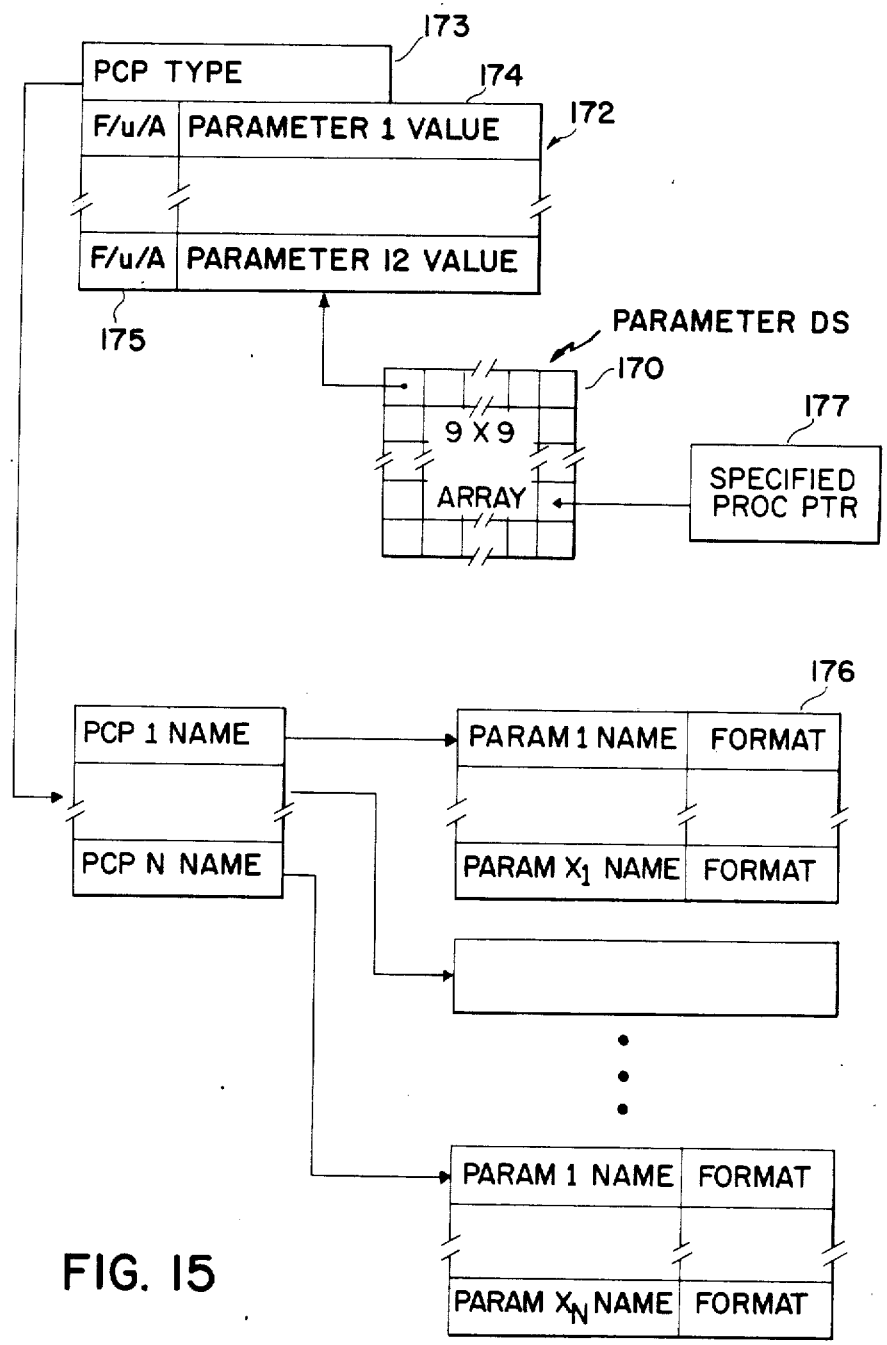
Figure 16A:
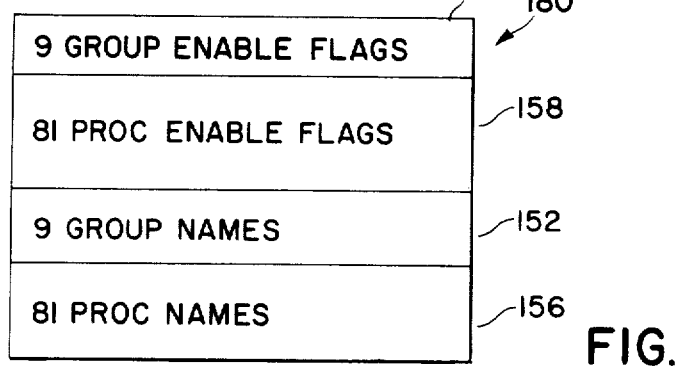
FIGS. 16a–16c show the memory storage scheme for the data structures used in the preferred embodiment of this invention.
Figure 16B:
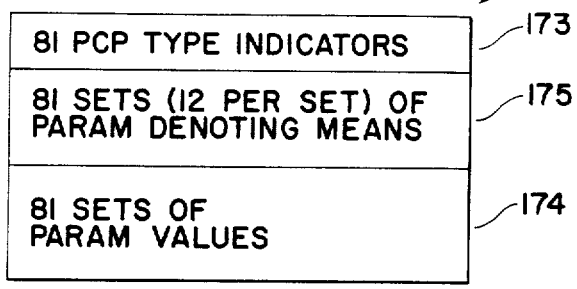
Figure 16C:
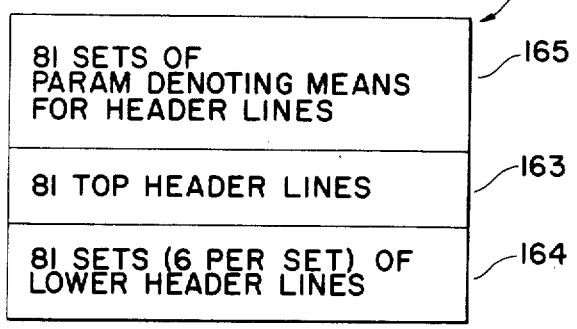

Referring to FIGS. 12, 13, 14, 15 and 16a-16c, there are shown block diagrams of the main data structures used in the preferred embodiment of this invention. FIGS. 12 through 15 show how these data structures are logically organized and interrelated. FIGS. 16a-16c show how the data structures are actually stored in memory and on disc in the preferred embodiment.

As described above, in the preferred embodiment data structures are defined and stored for eighty one predefined processes which are organized into nine groups of processes, where each such group contains nine processes. These data structures are initially defined by the engineering set up module 26 (FIG. 3), then are stored on a disc 35 for later use, and then copied into the computer's memory for use by the operator control module 28.

Figure 12:
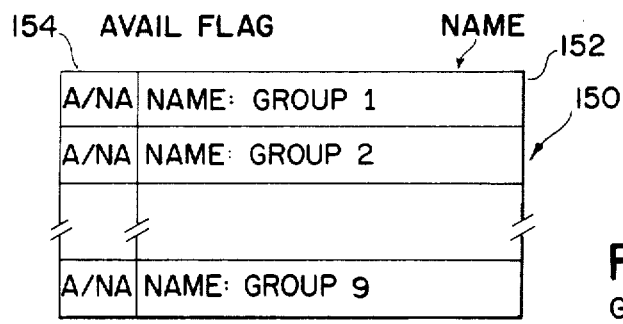
FIGS. 12 through 15 depict the primary data structures used in the system and method of this invention.

Referring to FIG. 12, the Group Prompt data structure 150 contains a set of nine process group names 152, each up to twenty characters long, and a set of nine corresponding group availability flags 154. The group names 152 show up on the operator screen, as shown, for example, in Table 6 during the process selection step described above. Each group availability flag is equal to 0 if the corresponding group is available for use by the operator and is equal to 1 if the group is not available.

Figure 13:
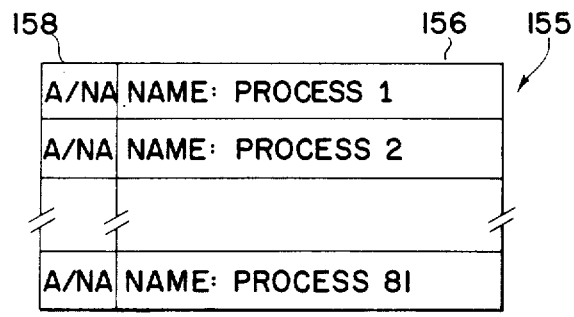

Referring to FIG. 13, the Process Prompt data structure 155 contains a set of eighty one process group names 156 and a set of corresponding process availability flags 158. The first nine process names belong to the first group, the next nine process names belown to the second group, and so on. The process names 156 for a selected group show up on the operator screen, as shown, for example, in Table 7 during the process selection step described above. Each process availability flag is equal to 0 if the process is available for use by the operator and is equal to 1 if the process is not available.

Referring to FIG. 14, the Header data structure 160 contains the header lines for each process (see for example the header lines shown just below the top prompt line in Table 9). Conceptually, the Header data structure 160 comprises a nine by nine array of process header data structures 162. Each process header data structure 162 contains the text 163a of a top header line (up to fifty characters long) and the text 164a of six regular head lines (each up to twenty characters long). Further, for each header line in the process header data structure there is a status flag which is equal to 0 if the header line is a forced entry line, 1 if the header line is a may change line, and 2 if the header line's text is fixed.

Referring to Table 9, the regular header lines are stored in such an order that the first regular header line is displayed on the left and the second is display on the right, and so on, so that each two lines comprise a pair when viewed during the operator parameter entry process described above. Typically, the left header lines will contain fixed text which indicates the value to be entered by the operator into the corresponding right header line.

Referring to FIG. 15, the Parameter data structure 170 is used to store the parameter values for all the predefined processes. Conceptually, the Parameter data structure 170 comprises a nine by nine array of process parameter data structures 172. Each process parameter data structure 172 contains an indicator 173 of the process control program associated with the process, and the default values 174, if any, of all the variable parameters associated with the process control program. The indicator 173 of the process control program acts as an indirect pointer from the data structure 172 to the process control program associated with the process.

Further, for each parameter the process parameter data structure contains a parameter status flag 175 which is equal to 0 if the parameter's status is FORCED (i.e., a forced entry parameter which must be given a value by the operator before the process can be run), 1 if the parameter's status is MAY CHANGE (i.e., changeable by the operator) parameter, and 2 if the parameter's status is LOCKED (i.e., fixed in value).

Since each process control program will typically have different parameters associated with it, the engineering set up module includes for each process control program a data structure format 176 which specifies the names of the parameters associated with the process, the order of the parameters are to be stored in the process parameter data structures 172, and the format of each parameter. Each parameter has a format because some may be stored simply as text, others may be stored as an integer or floating point number, and still others may be stored as a date or in another special data format.

As will be described in somewhat greater detail in the discussion of the engineering set up process, there is a specified process pointer 177 which is used to point to the parameter and header data structures of a specified process. This specified process is the process which is currently selected (i.e., specified) for being set up by the engineering set up process.

Referring to FIGS. 16a-16c, in the preferred embodiment, the above-described data structures are actually stored in the computer's memory in a different format than that described above.

Basically, the memory storage scheme is that each type of item in the data structures are stored together as a separate array. As is standard in such memory storage schemes, related items in different arrays are associated with one another by a common pointer or index. In other words, the Nth item in one array (e.g., the array of process availability flags) corresponds to the Nth item in another related array (e.g., the process name array).

The memory storage scheme used in the preferred embodiment facilitates both quick data processing and also quick reading and copying of the data structures from a disc 35.

The reference numerals used for the arrays shown in FIGS. 16a-16c correspond to the data structure elements shown in FIGS. 12 through 15.

Referring to FIG. 16a, the Prompt data structure 180 comprises, in order, arrays for the nine process group availability flags 154; the eighty one process availability flags 158; the nine group names 152; and the eighty one process names 156.

Referring to FIG. 16b, the Param data structure 182 comprises, in order, arrays for eighty one process control program type indicators 173; eighty one sets (twelve each) of parameter status flags 175 (also called parameter denoting means); and eighty one sets of parameter values 174. As discussed above, each parameter value can be stored in a distinct format in accordance with the type of value represented by the parameter. Thus some parameter values may be stored simply as text, others may be stored as an integer or floating point number, and still others may be stored as a date or in another special data format.

Referring to FIG. 16c, the Header data structure 184 comprises, in order, arrays for eighty one sets of header line status flags 165 (also called process denoting means); eighty one top header lines 163; and eighty one sets of regular header lines 164 (each set having six such header lines).

In the preferred embodiment, the same amount of memory space is allocated for the process parameter data structure of every process even though the number of parameters actually needed may vary from one process control program to another. Thus space is allocated in the parameter data structure 182 for twelve parameter values for every process, the maximum needed by any of the process control programs used in the preferred embodiment. It will readily be appreciated that this is one example only and other data structure formats may be used for other process control programs. For instance, the number of parameters stored for each process could vary in accordance with the process control program associated with the process. Furthermore, in other embodiments of this invention memory space for the data structures used could be dynamically allocated as new processes and new groups of processes are defined.

Initial System Configuration

When a system 24 in accordance with the preferred embodiment is initially configured, but before engineering set up, it contains all the elements needed to quickly and easily set up a useable system. The hardware for the system comprises the computer(s) for the engineering and operator modules, the tester, and the interface between the two.

The software for the system includes not only the engineering set up program, the operator control program, and the introduction program, but also the process control programs for controlling the tester system. Furthermore, an initial set of data structures, in the format shown in FIGS. 16*a*-16*c*, on a disc are provided and the engineering control program is provided with the data structure formats for each process control program. The initially provided set of data structures generally has some exemplary processes defined therein to facilitate set up by an engineer who has not used the system before. Additional process control programs can be added to the system as long as the corresponding data structure formats are added to the engineering set up program.

The following discussion shows how such an initially configured system can be transformed into a system tailored to the needs of each user.

Engineering Set Up

Figure 17:
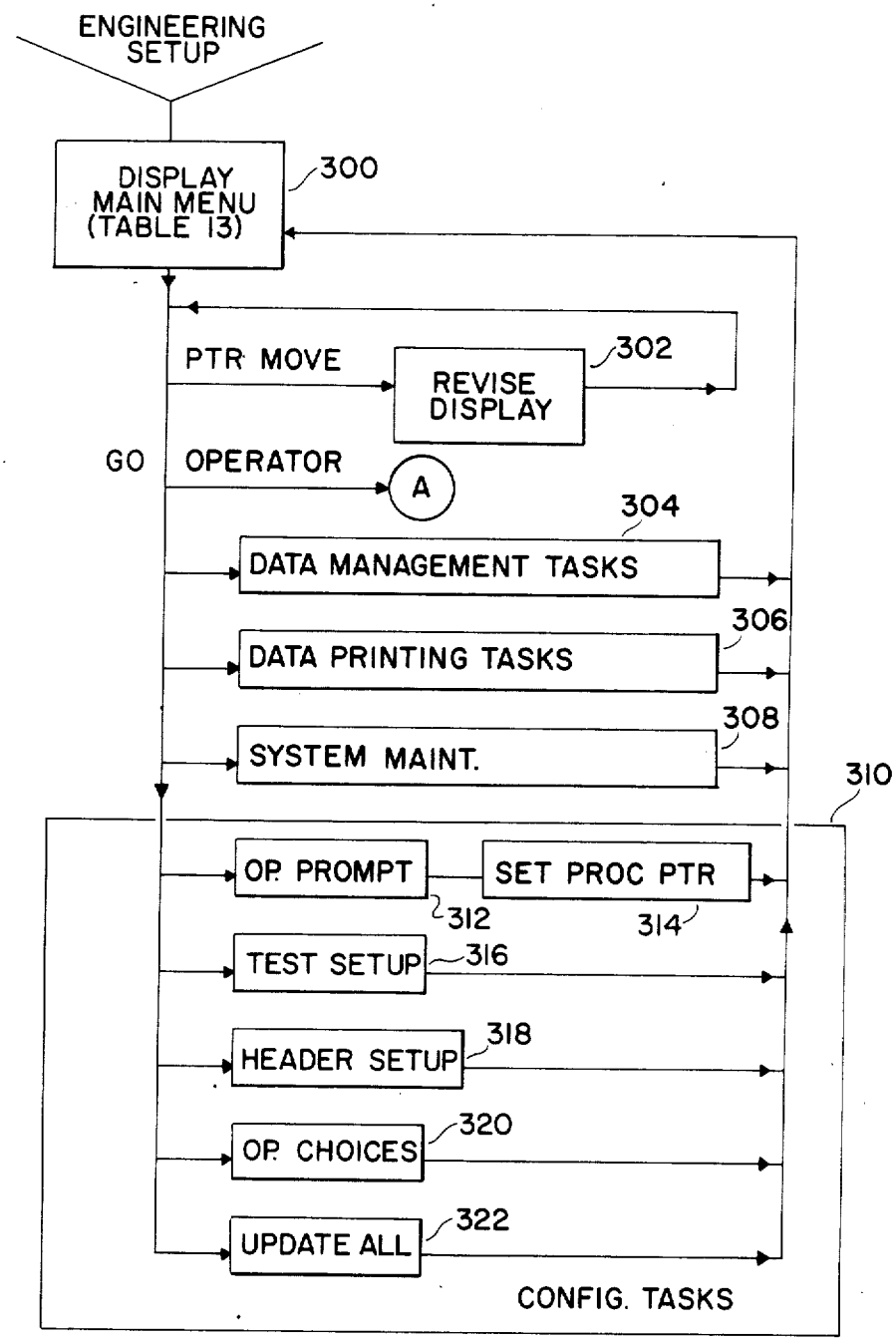
FIGS. 17 through 21 are flow charts of the engineer set up program of the preferred embodiment of this invention.

Referring to FIG. 17, there is shown a general flow chart of the engineering set up process. As discussed above with reference to FIG. 6, the engineering set up process is initiated by the correct entry of a password after the display of the system's introductory message.

The first step of the engineering set up program is to display a MAIN MENU, such as the one shown in Table 13. The MAIN MENU uses the above-described dynamic menu feature. It is used by the engineer to select one of a number of predefined engineering tasks, grouped in several task groups.

The MAIN MENU includes two menu display regions, each with its own pointer. The item being pointed at in each menu display region is displayed in reverse video (shown with an asterisk next to the item in Table 13). Only one of the pointers, called the currently active pointer, can be moved at any one time. The title of the menu display region associated with the currently active pointer is displayed in reverse video, and the item pointed to by the active pointer is displayed in bright reverse video (shown with a leftward arrow pointing to the item in Table 13).

The first menu region, entitled MENU, identifies groups of engineering tasks. The second menu region, entitled ITEM, lists the tasks corresponding to the task group being pointed at in the first menu region.

When the active pointer is the MENU pointer, pointer movements are responded to by replacing the ITEM menu with a list of tasks corresponding to the MENU item currently being pointed to (box 302). Also, each time the pointer is moved within one of the two menu regions, the item formerly pointed to is rewritten in normal video and the new item being pointed to is rewritten in reverse video. Furthermore, when the currently active pointer is moved from one menu region to the other, the title of the one region is rewritten in normal video and the other is rewritten in reverse video.

The top prompt line of the MAIN MENU screen identifies the screen as the MAIN MENU, and also identifies the currently specified process by its group name, process name, and the name of the corresponding process control program.

Referring back to FIG. 15, there is a pointer 177 which points to the data structures associated with one specified process. For convenience, it is said that this pointer 177 points to a specified process. When the engineering set up program is first loaded, this specified process pointer 177 is automatically set to point to the first process (i.e., the data structures for the first process) in the data structures stored in the computer's memory. As will be described below, the specified process pointer can be set to point to any specified process using the Operator Prompt engineering task.

Referring again to FIG. 17 and Table 13, selection of the OPERATOR task, by touching the OPERATOR box on the display screen, terminates the engineering set up process and returns the engineer to the introductory screen.

Selection of the GO task, by touching the GO box on the display screen, initiates the engineering task currently pointed to in the ITEM menu.

Since the Data Management tasks, Data Printing tasks, and System Maintenance tasks shown in the MAIN MENU are less important than the Configuration tasks, in that they are not central aspects of this invention, they will be discussed only briefly after the discussion of the Configuration tasks. However, for exemplary purposes, Table 14 shows the display produced by moving the MENU pointer down two items to point at DATA PRINTING, moving the active pointer to the ITEM menu by using the rightward cursor movement key, and then moving the ITEM pointer down one item to point at CONFIGURATIONS.

Within the group of Configuration tasks 310, the first task performed by the engineer is usually the OPERATOR PROMPT task 312 because this is used to set the specified process pointer to point at the process which the engineer wants to next set up 314. OPERATOR PROMPT 312 is also used to change the names of process groups, the names of individual processes, and the process control program associated with each process.

The TEST SET UP task 316 is used to denote in the data structure for the currently specified process which parameters are forced entry parameters, which are operator alterable parameters, and which are fixed, operator unalterable parameters. Also, TEST SET UP is used to provide default values for operator alterable parameters and fixed values for operator unalterable parameters.

Header Set Up 318 is virtually identical to TEST SET UP 316 except that it is used to set up the header lines for the specified process instead of the parameters.

The OPERATOR CHOICES task 320 is used to denote in the Prompt data structure which process groups and which individual process are available and which are unavailable to the operator.

The UPDATE ALL task 322 is used to copy all the Prompt, Header and Parameter data structures shown in FIGS. 16a–16c onto a disc 35.

After the performance of any of the engineering tasks the MAIN MENU is redisplayed 300, except that certain tasks, such as Update All do not cause the MAIN MENU to ever be replaced in the first place.

Operator Prompt

Figure 18:
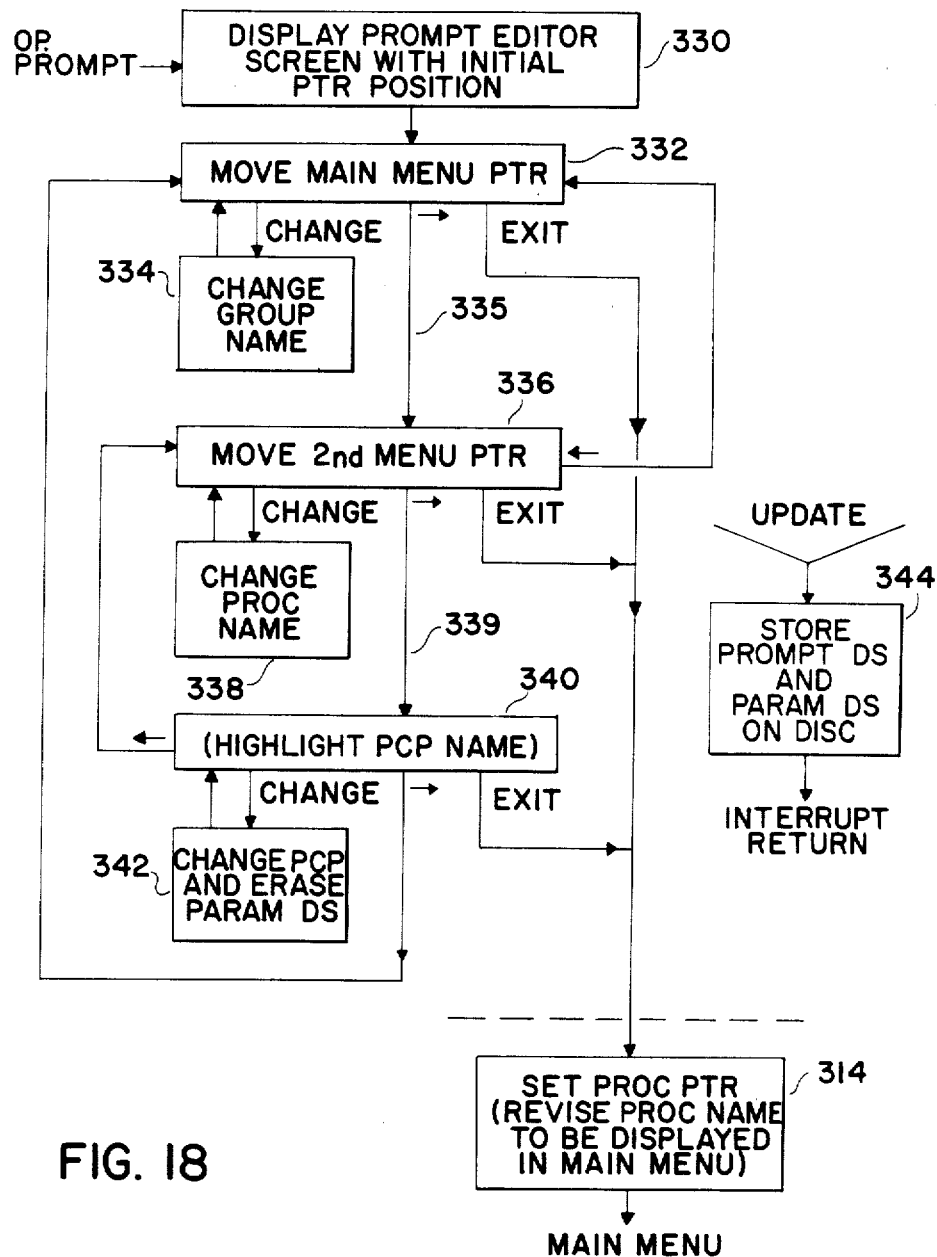

Referring to FIG. 18, the OPERATOR PROMPT task begins by displaying a PROMPT EDITOR screen (box 330), such as the one shown in Table 15. As can be seen in Table 15, the top prompt line of the screen identifies the engineering task (i.e., PROMPT EDITOR) and the group name, process name and process control program for the currently specified process.

The PROMPT EDITOR display includes two menu display regions, entitled TITLE and CONFIGURATION, and a third display region, entitled TEST TYPE, which identifies the process control program for each of the items listed in the CONFIGURATION menu display region.

FIG. 18 shows the flow chart for an exemplary use of the OPERATOR PROMPT task. After the PROMPT EDITOR screen is displayed (box 330), the engineer can move the pointer for the first menu display region up and down (box 332).

As described above in the discussion of the dynamic menu feature of this invention, each time the main menu pointer (i.e., the pointer for the first menu display region) is moved, the list in the second menu display region is automatically replaced with the list of process names corresponding to the group name currently being pointed at in the first menu display region. An example of this updating of the second menu display region during the OPERATOR PROMPT task is shown in Tables 16 and 17.

In Table 15 the main menu pointer is pointing at the first group name and the second menu display region contains a list of the process names for that group. In Table 16 the main menu pointer has been moved to point at the third group name and the second menu display region has been automatically rewritten so that it now contains a list of the process names for that third group. Further, for examplary purposes, in Table 17 the active pointer has been moved to the CONFIGURATION menu and has been moved down to the second item in that menu. In the preferred embodiment, when the main menu pointer is moved the pointer for the second menu display region is automatically reset to point at the top item in that menu.

When the active pointer is pointing at any item in the first menu display region, selecting the CHANGE task by pressing the CHANGE box on the display allows the engineer to change the group name being pointed at (box 334). The revised text is stored in the group names array 152 in Prompt data structure 180.

Similarly, after the active pointer is moved to the second menu (process flow path 335), the second menu pointer can be moved (box 336) to point at the name of any of the processes listed in the second menu. Selecting the CHANGE task allows the engineer to change the process name being pointed at (box 338) and the revised text is stored in the process names array 156 in Prompt data structure 180.

From the second menu display region, the active pointer can be moved to the TEST TYPE display region (process flow path 339), which causes the process control program name in the TEST TYPE display region to be shown in bright reverse video (box 340). The pointer can not be moved up and down within the TEST TYPE display region in the preferred embodiment. Thus the item pointed at by the pointer for the CONFIGURATION menu display region determines which item will be pointed at in the TEST TYPE display region.

The process control program associated with a process can be changed by selecting the CHANGE task when the active pointer is pointing at the TEST TYPE menu item for that process. The process control program is changed (box 342) by using the up and down cursor keys to scan through a list of the names of the predefined process control programs. Each depression of the up or down cursor keys on the system's keyboard 33 brings up a new process control name for the list.

In the preferred embodiment, as soon as the CHANGE task is activated for changing the process control program designated in the TEST TYPE menu, the Parameter data structure 172 for the corresponding process is erased (i.e., replaced with blank data) because it is assumed that the parameter values for one process control program will be meaningless (or improper) for any other process control program.

Selection of the UPDATE task, by pressing the UPDATE box on the display, causes the Prompt data structure 180 to be copied onto a disc 35 (box 344). This is done without rewriting the display, except to temporarily replace the UPDATE box on the display with the message BUSY in reverse video until the copying process is complete. Since the UPDATE task acts as an interrupt task, when the UPDATE task is complete the OPERATOR PROMPT program returns to the same point of the program it was at just before the UPDATE task was selected.

Selection of the EXIT task, by pressing the EXIT box on the display, causes the specified process pointer 177 to be set so as to point at the process currently being pointed at in the CONFIGURATION menu (box 314). Then the process returns to the MAIN MENU display (see box 300 in FIG. 17), with the name of the process now being pointed at by the specified process pointer being shown in the top prompt line. For instance, selecting the EXIT task while the display is as shown in Table 17 will cause the specified process pointer to point to the process named 1E13—BORON (MAP), and the top prompt line in the MAIN MENU will thereafter read:

```
MAIN MENU NOVA NV10-1 1E13 -BORON
        (MAP) CONTOUR MAP.
```

Operator Choices

Referring to FIG. 19, the OPERATOR CHOICES task begins by displaying an OPERATOR CHOICES screen (box 350), such as the one shown in Table 18. As can be seen in Table 18, the OPERATOR CHOICES display is very similar to the above-described PROMPT EDITOR display. The main differences are that the identified task in the top prompt line is OPERATOR CHOICES instead of PROMPT EDITOR, and the lower lefthand task box is entitled SELECT instead of CHANGE.

FIG. 19 shows the flow chart for an exemplary use of the OPERATOR CHOICES task. After the OPERATOR CHOICES screen is displayed (box 350), the engineer can move the pointer for the first menu display region up and down (box 352).

As described above in the discussion of the dynamic menu feature of the invention, each time the main menu pointer is moved, the list in the second menu display region is automatically replaced with the list of process names corresponding to the group name currently being pointed at in the first menu display region.

Unlike the prompt editor display, in the OPERATOR CHOICES display, group names and process names are written in normal video if the corresponding group or process is denoted in the prompt data structure as not available (for use by the operator), and they are written in reverse video (shown with an asterisk in Table 18) if the corresponding group or process is denoted in the prompt data structure as available.

Also unlike the PROMPT EDITOR display, the pointer in each display region of the OPERATOR CHOICES display is shown by the use of arrows on the display, with the active pointer being shown in bright reverse video. The title of the display region with the active pointer is shown in bright reverse video. In Table 18 the pointer positions are shown by underlining the items pointed at, the active pointer is shown by an arrow, and the enabled items are denoted with asterisks.

When the active pointer is pointing at any item in the first menu display region, selecting the SELECT task by pressing the SELECT box on the display toggles the availability flag for the group being pointed at (box 354). In other words, if the group was previously not available, pressing the SELECT box causes the group to be denoted as available; and if the group was previously available, pressing the SELECT box causes the group to now be denoted as not available.

Furthermore, the group name being pointed to is rewritten so that it is shown in normal video if the group is now not available, and is rewritten in reverse video if it is now available. The revised availability flag is stored in the group availability flag array 154 of the Prompt data structure 180.

Similarly, after the active pointer is moved to the second menu (process flow path 355), the second menu pointer can be moved (box 356) to point at the name of any of the processes listed in the second menu. Selecting the SELECT task toggles the availability flag for the process being pointed at (box 358) and the revised availability flag is stored in the process availability flag array 158 of the Prompt data structure 180.

From the second menu display region, the active pointer can not be moved to the TEST TYPE display region. The TEST TYPE display region is provided solely for the convenience of the engineer—so that he does not have to remember, or look elsewhere to determine, the process control program associated with each process.

Selection of the UPDATE task, by pressing the UPDATE box on the display, causes the Prompt data structure 180 to be copied onto a disc 35 (box 357). This is done without rewriting the display, except to temporarily replace the UPDATE box on the display with the message BUSY in reverse video until the copying process is complete. Since the UPDATE task acts as an interrupt task, when the UPDATE task is complete the OPERATOR PROMPT program returns to the same point of the program it was at just before the UPDATE task was selected.

Selection of the EXIT task, by pressing the EXIT box on the display, causes the program to return to the MAIN MENU display (box 359) (see box 300 in FIG. 17).

Test Set Up and Header Set Up

Figure 20:
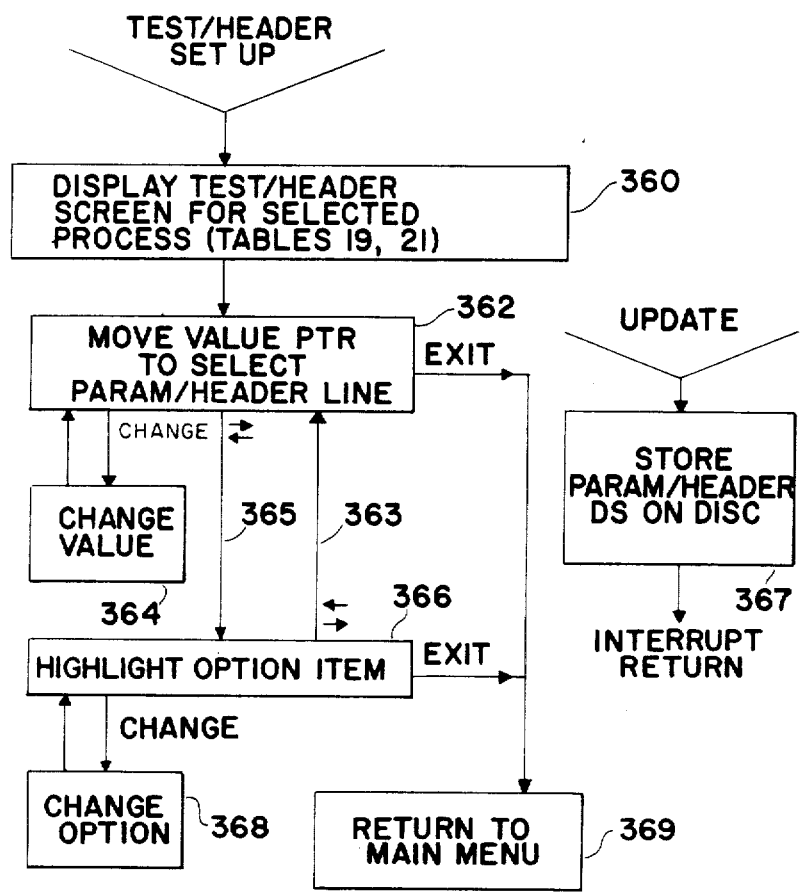

Referring to FIG. 20 the TEST SET UP task begins by displaying a TEST SET UP display for the specified process, such as the display shown in Table 19 (box 360). The TEST SET UP shown in Table 19 corresponds to the operator PARAMETER ENTRY screen shown in Table 9.

The top prompt line of the TEST SET UP display identifies that the task being performed is TEST SET UP and identifies the specified process which is being set up.

The central protion of the display includes three display regions: the first lists the names of the parameters for the specified process; the second lists parameter values for each of the parameters; and the third denotes whether the parameter is LOCKED (i.e., fixed in value), MAY CHANGE (i.e., changeable by the operator), or FORCED (i.e., a forced entry parameter must be given a value by the operator before the process can be run).

Referring to the parameters for the CONTOUR MAP process control program shown in Table 19, the NUMBER OF SITES parameter determines the number of sites on the wafer at which resistivity measurements are made. WAFER DIAMETER specifies the size of the wafer being tested. TEST DIAMETER specifies the size of the area to be tested. CONTOUR INTERVAL specifies the resistivity differential between contour lines on the resistivity contour map generated from the data collected. PRINT TEST RESULT specifies whether the process control program should print a contour map. TEST WAFER ID andd WAFER LOT ID are used to identify the wafer being tested. WAFER PROCESS DATE is the date the test is being run. MEASURE CURRENT either specifies a specific current value, such as 1 milliamp, or specifies AUTOMATIC for an automatic current level selection mode of operation. SORT CRITERION is an analysis control parameter for screening out erroneous data which specifies that data which differs from the other data values by more than a specified amount will be assumed to be erroneous.

Table 20 shows the TEST SET UP screen for a diameter scan process. As can be seen by comparing Tables 19 and 20, the parameters for the contour map and diameter scan process control programs are different, and therefore the format of their respective data structures are also different. Note that the ANGLE OF SCAN parameter controls the orientation of the wafer diameter along which resistivity measurements are made.

The pointer for the second (VALUE) display region is moved up or down to select the parameter which the engineer wants to modify (box 362). Then the engineer can select the CHANGE task, by touching the CHANGE box on the display, to change the default value for the parameter (box 364). The method of changing the parameter value will depend on the format of the parameter value, as previously described.

By moving the active pointer to the OPTION display region (process flow path 365) the engineer can change the parameter status flag for the parameter. The OPTION item is highlighted when the pointer is moved. Then the engineer can select the CHANGE task, by touching the CHANGE box on the display, to change the value for the parameter status flag (box 368). The value of the parameter status flag in the OPTION display region toggles from LOCKED, to MAY CHANGE, to FORCED as the engineer uses the up or down cursor keys on the keyboard 33. As the displayed value of the selected parameter status flag value is changed, the internally stored value in the parameter data structure 182 is also changed.

When the engineer moves the active pointer back to the VALUE menu (process flow path 363) he can move on to set up another parameter.

Selection of the UPDATE task, by pressing the UPDATE box on the display, causes the Parameter data structure 182 to be copies onto a disk 35 (box 367). This is done without rewriting the display, except to temporarily replace the UPDATE box on the display with the message BUSY in reverse video until the copy process is complete. Since the UPDATE task acts as an interrupt task, when the UPDATE task is complete the OPERATOR PROMPT program returns to the same point of the program it was at just before the UPDATE task was selected.

Selection of the EXIT task, by pressing the EXIT box on the display, causes the program to return to the MAIN MENU display (box 369) (see box 300 in FIG. 17).

HEADER SET UP is virtually identical to TEST SET UP except that header lines are being set up instead of parameter values. An exemplary HEADER SET UP display is shown in Table 21. Set up proceeds by the engineer moving the active point to the header line that he wants to set up (box 362) and then either changing the text stored for that header line and/or changing the parameter status flag for that header line. The HEADER SET UP shown in Table 21 corresponds to the operator parameter entry screen shown in Table 9.

Update All

Figure 21:

Referring to FIG. 21, the Update all task causes the Prompt, Parameter, and Header data structures 180, 182 and 184 to be copied to a disc 35. The MAIN MENU is not disturbed while this happens, except that the text in the GO box on the display is temporarily replaced with the word BUSY in reverse video.

Other Engineering Tasks

Briefly summarized, the data management tasks (box 304 on FIG. 17) are a set of tasks for printing contour maps and such from stored data, for plotting resistivity trend analyses, and for performing other similar types of data analysis on data collected from the tester.

The data printing tasks (box 306) are for printing summaries, such as the one shown in Table 22, of process set ups, blank forms for engineering set ups, and other system information.

The system maintenance tasks (box 308) include a set of basic system utilities, such as those normally provided by the computer's operating system. Also provided is a program for changing the password used to gain entry to the engineering set up program.

Operator-Related Discs

It is a feature of this invention that the data structures for a set of processes can be stored on many different discs, each with a different combination of operator access levels and levels of discretion in parameter entry. Thus, for example, a set of data structures can be stored on a number of different discs so that, for the same basic set of processes, one disc can have data structures that allow the operator to run one set of process, while another disc has data structures that allow different processes to be run, and yet another allows some of the same processes to be run as the first, but with greater operator freedom allowed in the entry of parameter values.

As will be clear to those skilled in the art, the discs 35 used in the preferred embodiment are equivalent to any nonvolatile, portable storage means which can be used to store the above-identified data structures. Thus cassette tapes, bubble memory cartridges and the like could be used in other embodiments of this invention.

This feature of providing different operator-related discs to provide different operator access to the running of a predefined set of processes allows different operators to be provided with operator access appropriate to the tasks assigned to them and to their level of skill in the use of the system. Access levels are adjustable both in terms of the processes made available to the operator (using the process availability flag in the data structure for each process) and in terms of the specific level of operator discretion in parameter entry (using the parameter status flag in the data structure for each parameter).

Furthermore, since all of the data structures for all of the the processes are stored on each disc, the engineer can easily and quickly reconfigure the operator access level to processes and operator discretion in parameter entry by inserting the operator-related disc into the computer and running the engineering control program to alter the content of the data structures denoting either process availability or parameter designations.

Another feature of the discs used in this invention is that the same disc used to store data structures can also be used to store the data collected by the process or processes defined by those data structures. This is convenient because the data collected can be related back to the process set up on the same disc. In an alternate embodiment of this invention, this self documenting feature of the discs can be improved or strengthened by making revision of the data structures by the engineering module subject to entry of a password. Alternately, the use of a password could be required only when data files are also present on the disc.

A related feature of the discs is that, in alternate embodiments of this invention, data analysis and data management tasks could be performed by a data processing module that is separate from the engineering and operator control modules. In the preferred embodiment, basic data analysis tasks are included in the process control programs and the engineering module includes the remaining data analysis and data management tasks provided by the system. However, the use of portable, nonvolatile storage media for data storage facilitates the separation of these tasks in contexts where such separation is advantageous. For instance, in any context where the data analysis programs require significantly greater computer resources than is required by the engineering and operator control programs, use of a separate data processing module may be advantageous.

Process Control Program Execution

Referring back to FIG. 6, in the preferred embodiment, when the software for the system is loaded into the system's computer memory (box 52), the process control programs for the system are also loaded into memory. In alternate embodiments of this invention, this may not be practical. Especially in applications having either large numbers of process control programs and/or process control programs which occupy signifcant amounts of memory, the process control program invoked by the operator (see 74 in FIG. 7 may have to be loaded into the computer's memory at the time that it is run. Since this technique of loading software modules when needed is widely used in the prior art, the specific details as to how it is accomplished need not be discussed here.

Another aspect of process control program execution is the passing of parameters from the operator control program to the process control program. In the preferred embodiment, while the process control program has access to all the parameters for the selected process, including the header lines, generally only a few of these parameters are process control parameters. These parameters are used by the process control program to determine what commands are to be sent to the tester 22. For instance, the number of sites parameter for the CONTOUR MAP process control program is a process control parameter because it affects the commands given by the control system 24 to the wafer tester 22.

A second type of parameter used by the process control program are analysis control parameters. These are used to control the analysis performed by the process control program on the data collected while the process is run. Using the CONTOUR MAP program as an example, the contour interval parameter is an analysis parameter which specifies resistivity differential between contour lines on the contour map generated from the wafer resistivity data collected.

The remaining parameters associated with each process are called data parameters because they are provided primarily so that data collected from the process can be later identified. While all the parameters for a process may be stored at the beginning of the data file in which data collected by the process is stored, the data parameters usually serve no other purpose for the process control program. For the CONTOUR MAP program, the test wafer and wafer lot identifier parameters are clearly data parameters.

Examples of Potential Alternate Embodiments of the Invention

As discussed above with reference to the background of this invention, the prior art includes a wide variety of computer controlled processes. The point of departure between the aforementioned prior art and the present invention is related to the concept that a process control method can be flexible in both the degree and type of freedom afforded the operator running a predefined class of processes (e.g., testing the resistivities of semiconductor wafers).

While the preferred embodiment of this invention concerns a method of testing the resistivities of semiconductor wafers, the following discussion of another possible application of this invention, the process of running a computer controlled lathe, will clarify the usefulness and motivation for this invention.

A computer controlled lathe can perform a large class of manufacturing processes. Normally, in the prior art each manufacturing task requires an individual control program. Considering a hypothetical system within the teachings of the prior art, a master program could be provided to select any one of a predefined set of lathe control programs. Furthermore, each program could require or allow the specification of predefined parameters, such as the size for a particular type of bolt which is to be made by the lathe.

The present invention, while providing the same capabilities as the above-described hypothetical system, differs from it the following ways. First, the set of available processes is organized and presented using an improved menu method which greatly facilitates the selection of a process and the set up of default parameter values.

Second, this invention divides the process control method into an engineering set up process and an operator process. In the engineering set up process the set of processes available to the operator process is defined, and the parameters for those processes are defined in terms of whether their values are (1) preselected and fixed; (2) preselected and open to change by the operator process; or (3) required to be specified by the operator process.

The operator process operates within the constraints and requirements defined in the engineering set up process. Thus if the operator process is constrained to a single process configuration, it resembles a prior art process controller with a single control program. At the other extreme, if the operator process is given no constraints, it resembles the above-described hypothetical system.

Significantly, this invention also allows the operator to be constrained in much more meaningful ways. For instance, the set of available processes could comprise the set of lathe tasks for making specially designed items for different customers. Different process control programs, also called manufacturing algorithms, are provided for each class of objects to be manfactured. The engineering process can be used to constrain the operator process so that, for example, it can only perform the process configurations for the four types of objects which need to be manufactured during the next work shift. For the purposes of this example, assume that for one type of object, two or more parameters need to be specified by the operator process (e.g., the number of objects to be made, and the size or scale factor for the objects); and for the other three types of objects different numbers of parameters must be specified because of the variety of objects to be made within each class of objects.

The group, subgroup and process names for a set of exemplary lathe processes are shown in Tables 10, 11 and 12, which were discussed above with reference to the dynamic menu feature of this invention. As shown in these Tables, in alternate embodiments of this invention it may be advantageous to organize the processes in terms of a three level hierarchy (groups, subgroups and processes) instead of the two level hierarchy (groups and processes) used in the preferred embodiment.

Using this invention, all these constraints and required parameters for the operator process can be defined by the engineering set up process using a menu driven computer process. In fact, the engineering set up for each lathe or set of lathes can be stored on a portable magnetic disc and delivered to the operator(s) in charge of the equipment. Thus, even though the number of different tasks which can be performed by the equipment being controlled is virtually infinite, this invention allows the process of running the equipment to be controlled and the ranges of processes which can be run to be constrained. Furthermore, the method of this invention avoids the need to write or produce special control programs to accommodate both a wide variety of operator processes and also the need to constrain the operator processes so that inappropriate operations are not performed.

A related point is that the definition of constraints on the operator process (i.e., the restriction on available processes and the characterization of parameters) is achieved through the use of a data structure which is used to denote these selections or constraint definitions. An important benefit of this aspect of this invention is that this data structure eliminates the need for different control programs to accommodate different degrees and types of freedom to be afforded the operator process in different situations. While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

PROMETRIX * OMNIMAP
Resistivity Mapping System

CONTOUR MAP
→ collect contour data
plot contour map
plot difference map
DIAMETER SCAN
collect diameter data
plot diameter data
UTILITIES
probe qualification
edit file
file directory
trend analysis
disk maintenance menu
Data device: Winchester
© Copyright 1984 Prometrix Corp. Version 3.1

TABLE 2

PROMETRIX * OMNIMAP
Resistivity Mapping System
20-MAR-85

| PARAMETER | VALUE |
|---|---|
| OPERATOR | A. K. SMITH |
| SHIFT | DAY |
| STATUS: | ENTER NUMBER OF SITES: 225 |

TABLE 3

PROMETRIX * OMNIMAP
Resistivity Mapping System
20-MAR-85

| PARAMETER | VALUE |
|---|---|
| OPERATOR | A. K. SMITH |
| SHIFT | DAY |
| NUMBER OF SITES | 225 SITES |
| WAFER DIAMETER | 76.29 mm/3.0 in |
| TEST DIAMETER | 63.50 mm/2.5 in |
| CONTOUR INTERVAL | 1.00 percent |
| PRINT TEST RESULT | YES, PRINTING ON |

TABLE 3-continued

PROMETRIX * OMNIMAP
Resistivity Mapping System
20-MAR-85

| PARAMETER | VALUE |
|---|---|
| TEST WAFER ID | N15 |
| WAFER LOT ID | AMX37 |
| WAFER PROCESS DATE | MAR-20-1985 |
| CURRENT | MANUAL |
| SORT CRITERION | 3 SIGMA |
| STATUS: ADJUST CURRENT LEVEL SETTING TO 5 MA | |

TABLE 4

SOFTWARE MODULES IN PREFERRED EMBODIMENT

MAIN MODULE
Introduction
Display Introduction Screen
Check Engineer Password
Process Control Programs
HP 150 Bit Mapped Screen Service Routines
ENGINEER SET UP MODULE
Read Data Structures From Disc
Main Menu
Configuration
Operator Prompt
Test Set Up
Header Set Up
Operator Choices
Update All
Data Management
Data Printing
System Maintenance
Disc Maintenance
Password Definition
OPERATOR MODULE
Read Data Structures From Disc
Process Selection
Group Selection
Specific Process Selection
Parameter Entry
Enable/Initiate Selected Process

TABLE 5

INTRODUCTION

PROMETRIX

OMNIMAP RS20
© COPYRIGHT 1985 PROMETRIX CORPORATION

NOTICE

This software is an unpublished, copyrighted word and contains proprietary information of Prometrix Corporation. Use is restricted to the REGISTERED LICENSEE on DESIGNATED HARDWARE at a DESIGNATED LOCATION and is subject to the terms of the Prometrix Software License Grant. This system is serialized in the name of the REGISTERED LICENSEE and may not be resold or transferred without the consent of Prometrix Corporation.

TOUCH SCREEN TO START

TABLE 6

SELECT PROCESS GROUP

TABLE 6-continued

| EXTRION DF4 | EXTRION CF3000 | NOVA NV10 - 1 |
|---|---|---|
| NOVA NV10 - 2 | LINTOTT IIIX | |
| | | |

| | EXIT | | HELP |
|---|---|---|---|

TOUCH BOX TO SELECT

TABLE 7

SELECT CONFIGURATION          NOVA NV10 - 1

| 1E12 - BORON (MAP) | 1E13 - BORON (MAP) | 1E14 - BORON (MAP) |
|---|---|---|
| 1E15 - BORON (MAP) | 1E12 - BORON (DIA) | 1E13 - BORON (DIA) |

TABLE 7-continued

| 1E14 - BORON (DIA) | 1E15 - BORON (DIA) | |
|---|---|---|

| | EXIT | | HELP |
|---|---|---|---|

TOUCH BOX TO SELECT

TABLE 8

SELECT CONFIGURATION          EXTRION DF4

| 1E12 - ARSENIC (MAP) | 1E13 - ARSENIC (MAP) | 1E14 - ARSENIC (MAP) |
|---|---|---|
| 1E15 - ARSENIC (MAP) | 1E12 - ARSENIC (DIA) | 1E13 - ARSENIC (DIA) |
| 1E14 - ARSENIC (DIA) | 1E15 - ARSENIC (DIA) | |

| | EXIT | | HELP |
|---|---|---|---|

TOUCH BOX TO SELECT

TABLE 9

PARAMETER ENTRY     NOVA NV10-1     1E13-BORON (MAP)     CONTOUR MAP

```
NOVA NV10 1E13 B/CM2 100KEV
    OPERATOR        _____     **
       SHIFT        _____     **
                                 *
```

PLEASE MAKE CHANGES IN
BRIGHTLY**
LIT VALUE FIELDS.

| NUMBER OF SITES | 225 SITES | |
|---|---|---|
| WAFER DIAMETER | 76.20 mm/3.0 in | |
| TEST DIAMETER | 63.50 mm/2.5 in | * |
| CONTOUR INTERVAL | 1.00 percent | * |
| PRINT TEST RESULT | YES, PRINTING ON | * |
| TEST WAFER ID | | ** |
| WAFER LOT ID | | ** |
| WAFER PROCESS DATE | MAR-20-1985 | * |
| MEASURE CURRENT | AUTOMATIC | * |
| SORT CRITERION | 3 SIGMA | * |

| CHANGE | START | EXIT | HELP |
|---|---|---|---|

TOUCH BOX TO SELECT

TABLE 10

| *GROUP | SUB-GROUP | ITEM | TYPE |
|---|---|---|---|
| * CUSTOMER A | * DEPT. 1 | * ITEM A-1-1 | * B9 |
| CUSTOMER B | DEPT. 2 | ITEM A-1-2 | A8 |
| CUSTOMER C | DEPT. 3 | ITEM A-1-3 | A7 |
| CUSTOMER D | DEPT. 4 | ITEM A-1-4 | A3 |

| SELECT | EXIT | | |
|---|---|---|---|

TOUCH BOX TO SELECT

TABLE 11

| *GROUP | SUB-GROUP | ITEM | TYPE |
|---|---|---|---|
| CUSTOMER A | * AIRPLANE DIV. | * BOLT 1 | * B9 |
| → * CUSTOMER B | SATELITE DIV. | WING TIP 1 | WT |
| CUSTOMER C | PROJECT X | WING TIP 2 | WT |
| CUSTOMER D | FST | GEAR XL | GX |

| SELECT | EXIT | CHANGE | |
|---|---|---|---|

TOUCH BOX TO SELECT

TABLE 12

| GROUP | *SUB-GROUP | ITEM | TYPE |
|---|---|---|---|
| * CUSTOMER A | AIRPLANE DIV. | * BOLT 991 | * B9 |
| * CUSTOMER B | SATELITE DIV. | FLANGE | FL |
| CUSTOMER C | → * PROJECT X | BRACE L3 | BR |
| CUSTOMER D | FST | PART N3NX | N3 |

| SELECT | EXIT | CHANGE | |
|---|---|---|---|

TOUCH BOX TO SELECT

TABLE 13

MAIN MENU    EXTRION DF4    1E12 - ARSENIC (MAP)    CONTOUR MAP

| * MENU | ITEM |
|---|---|
| * CONFIGURATION ← | * OPERATOR PROMPTS |
| DATA MANAGEMENT | TEST SET UP |
| DATA PRINTING | HEADER SET UP |
| SYSTEM MAINTENANCE | OPERATOR CHOICES |
| | UPDATE ALL |

| GO | | OPERATOR | HELP |
|---|---|---|---|

TOUCH BOX TO SELECT

TABLE 14

MAIN MENU    EXTRION DF4    1E12 - ARSENIC (MAP)    CONTOUR MAP

| MENU | * ITEM |
|---|---|
| CONFIGURATION | SYSTEM ID. |
| DATA MANAGEMENT | * CONFIGURATIONS ← |
| * DATA PRINTING | CONFIGURATION BLANKS |
| SYSTEM MAINTENANCE | |

| GO | | OPERATOR | HELP |
|---|---|---|---|

TOUCH BOX TO SELECT

TABLE 15

PROMPT EDITOR    EXTRION DF4    1E12 - ARSENIC (MAP)    CONTOUR MAP

| * TITLE | CONFIGURATION | TEST TYPE |
|---|---|---|

TABLE 15-continued

| | | |
|---|---|---|
| * EXTRION DF4<br>EXTRION CF3000<br>NOVA NV10 - 1<br>NOVA NV10 - 2<br>LINTOTT IIIX | * 1E12 - ARSENIC (MAP)<br>1E13 - ARSENIC (MAP)<br>1E14 - ARSENIC (MAP)<br>1E15 - ARSENIC (MAP)<br>1E12 - ARSENIC (DIA)<br>1E13 - ARSENIC (DIA)<br>1E14 - ARSENIC (DIA)<br>1E15 - ARSENIC (DIA) | * CONTOUR MAP<br>CONTOUR MAP<br>CONTOUR MAP<br>CONTOUR MAP<br>DIAMETER SCAN<br>DIAMETER SCAN<br>DIAMETER SCAN<br>DIAMETER SCAN<br>DIAMETER SCAN |

| CHANGE | UPDATE | EXIT | HELP |
|---|---|---|---|

TOUCH BOX TO SELECT

TABLE 16

PROMPT EDITOR   EXTRION DF4   1E12 - ARSENIC (MAP)   CONTOUR MAP

| * TITLE | CONFIGURATION | TEST TYPE |
|---|---|---|
| EXTRION DF4<br>EXTRION CF3000<br>* NOVA NV10 - 1<br>NOVA NV10 - 2<br>LINTOTT IIIX | * 1E12 - BORON (MAP)<br>1E13 - BORON (MAP)<br>1E14 - BORON (MAP)<br>1E15 - BORON (MAP)<br>1E12 - BORON (DIA)<br>1E13 - BORON (DIA)<br>1E14 - BORON (DIA)<br>1E15 - BORON (DIA) | * CONTOUR MAP<br>CONTOUR MAP<br>CONTOUR MAP<br>CONTOUR MAP<br>DIAMETER SCAN<br>DIAMETER SCAN<br>DIAMETER SCAN<br>DIAMETER SCAN<br>DIAMETER SCAN |

| CHANGE | UPDATE | EXIT | HELP |
|---|---|---|---|

TOUCH BOX TO SELECT

TABLE 17

PROMPT EDITOR   EXTRION DF4   1E12 - ARSENIC (MAP)   CONTOUR MAP

| TITLE | * CONFIGURATION | TEST TYPE |
|---|---|---|
| EXTRION DF 4<br>EXTRION CF3000<br>* NOVA NV10 - 1<br>NOVA NV10 - 2<br>LINTOTT IIIX | 1E12 - BORON (MAP)<br>* 1E13 - BORON (MAP)<br>1E14 - BORON (MAP)<br>1E15 - BORON (MAP)<br>1E12 - BORON (DIA)<br>1E13 - BORON (DIA)<br>1E14 - BORON (DIA)<br>1E15 - BORON (DIA) | CONTOUR MAP<br>* CONTOUR MAP<br>CONTOUR MAP<br>CONTOUR MAP<br>DIAMETER SCAN<br>DIAMETER SCAN<br>DIAMETER SCAN<br>DIAMETER SCAN<br>DIAMETER SCAN |

| CHANGE | UPDATE | EXIT | HELP |
|---|---|---|---|

TOUCH BOX TO SELECT

TABLE 18

OPERATOR CHOICES   NOVA NV10 - 1   1E13 - BORON (MAP)   CONTOUR MAP

| TITLE | * CONFIGURATION | TEST TYPE |
|---|---|---|
| * EXTRION DF4<br>* EXTRION CF3000<br>* NOVA NV10 - 1<br>NOVA NV10 - 2<br>LINTOTT IIIX | * 1E12 - ARSENIC (MAP)<br>1E13 - ARSENIC (MAP)<br>1E14 - ARSENIC (MAP)<br>1E15 - ARSENIC (MAP)<br>1E12 - ARSENIC (DIA)<br>1E13 - ARSENIC (DIA)<br>1E14 - ARSENIC (DIA)<br>1E15 - ARSENIC (DIA) | CONTOUR MAP<br>CONTOUR MAP<br>CONTOUR MAP<br>CONTOUR MAP<br>DIAMETER SCAN<br>DIAMETER SCAN<br>DIAMETER SCAN<br>DIAMETER SCAN<br>DIAMETER SCAN |

TABLE 18-continued

| SELECT | UPDATE | EXIT | HELP |

TOUCH BOX TO SELECT

TABLE 19

TEST SET UP   NOVA NV10   1E13 - BORON (MAP)   CONTOUR MAP

| PARAMETER | *VALUE | OPTION |
|---|---|---|
| NUMBER OF SITES | 225 SITES | LOCKED |
| WAFER DIAMETER | 76.20 mm/3.0 in | LOCKED |
| TEST DIAMETER | 63.50 mm/2.5 in | MAY CHANGE |
| CONTOUR INTERVAL | 1.00 percent | MAY CHANGE |
| PRINT TEST RESULT | YES, PRINTING ON | MAY CHANGE |
| TEST WAFER ID | | FORCED |
| WAFER LOT ID | | FORCED |
| WAFER PROCESS DATE | MAR-20-1985 | MAY CHANGE |
| MEASURE CURRENT | AUTOMATIC | LOCKED |
| SORT CRITERION | 3 SIGMA | MAY CHANGE |

| CHANGE | UPDATE | EXIT | HELP |

TOUCH BOX TO SELECT

TABLE 20

TEST SET UP   NOVA NV10 - 1   1E14 - BORON (DIA)   DIAMETER SCAN

| PARAMETER | *VALUE | OPTION |
|---|---|---|
| TYPE OF SCAN | *NORMALIZED SCAN → | MAY CHANGE |
| NUMBER OF SITES | 121 SITES | LOCKED |
| WAFER DIAMETER | 76.20 mm/3.0 in | LOCKED |
| TEST DIAMETER | 63.50 mm/2.5 in | MAY CHANGE |
| ANGLE OF SCAN | 90 degrees | MAY CHANGE |
| PERCENT DEVIATION | 3.00 percent | MAY CHANGE |
| PRINT TEST RESULT | YES, PRINTING ON | MAY CHANGE |
| TEST WAFER ID | | FORCED |
| WAFER LOT ID | | FORCED |
| WAFER PROCESS DATE | MAR-20-1985 | MAY CHANGE |
| MEASURE CURRENT | AUTOMATIC | LOCKED |
| SORT CRITERION | 3 SIGMA | MAY CHANGE |

| CHANGE | UPDATE | EXIT | HELP |

TOUCH BOX TO SELECT

TABLE 21

HEADER SET UP   NOVA NV10   1E13 - BORON (MAP)   CONTOUR MAP

| *HEADER | OPTION |
|---|---|
| NOVA NV10 1E13 B/CM2 100KEV | LOCKED |
| OPERATOR | LOCKED |
| | FORCED |
| SHIFT | LOCKED |
| | FORCED |
| | MAY CHANGE |
| | MAY CHANGE |

| CHANGE | UPDATE | EXIT | HELP |

TOUCH BOX TO SELECT

TABLE 22

PROMETRIX OMNIMAP RS20
WEDNESDAY   MAR 20, 1985   13:44
NOVA NV10 -1: 1E13 - BORON (MAP)

TABLE 22-continued

| LOCKED | NOVA NV10 1E13 B/CM2 100KEV | |
| LOCKED | OPERATOR | FORCED |
| LOCKED | SHIFT | FORCED |

TABLE 22-continued

| MAY | | MAY |
|---|---|---|
| CONTOUR MAP | | |
| PARAMETER | VALUE | |
| NUMBER OF SITES | 225 SITES | LOCKED |
| WAFER DIAMETER | 76.20 mm/3.0 in | LOCKED |
| TEST DIAMETER | 63.50 mm/2.5 in | MAY |
| CONTOUR INTERVAL | 1.00 percent | MAY |
| PRINT TEST RESULT | YES. PRINTING ON | MAY |
| TEST WAFER ID | | FORCED |
| WAFER LOT ID | | FORCED |
| WAFER PROCESS DATE | MAR-20-1985 | MAY |
| MEASURE CURRENT | AUTOMATIC | LOCKED |
| SORT CRITERION | 3 SIGMA | MAY |

What is claimed is:

1. In a method of controlling a process using a programmed digital computer, the steps of:
 (a) establishing a set of process control programs, each having associated therewith a set of predefined parameters;
 (b) defining a parameter data structure format for each of said process control programs, including
  parameter denoting means for denoting each of said predefined parameters as an operator unalterable parameter having a fixed value, an operator alterable parameter having a default value, or a forced operator entry parameter that must be supplied with a value before the process is run; and
  parameter value storing means for storing a value for each of said predefined parameters;
 (c) establishing an engineering set up control program for enabling interactive computer controlled performance of the steps of
  storing, for each of a multiplicity of specified processes, a parameter data structure in accordance with said parameter data structure format for a specified one of said process control programs;
  specifying one of said processes for engineering set up;
  entering into said parameter denoting means in said parameter data structure for said specified process a value for each of said predefined parameters to specify it as an operator unalterable parameter, an operator alterable parameter, or a forced operator entry parameter; and
  entering into the parameter value storing means in said parameter data structure for said specified process fixed values for said operator unalterable parameters and default values for said operator alterable parameters; and
 (d) establishing an operator control program for enabling interactive computer controlled performance of the steps of
  selecting one of said specified processes;
  utilizing said stored parameter data structure for said selected process, entering values for said operator alterable and forced operator entry parameters for said selected process; and
  running the process control program corresponding to said selected process only after values have been entered for all the forced operator entry parameters corresponding to said selected process.

2. The method of claim 1, further including the step of:
 defining and storing for each of said multiplicity of specified processes a process selection data structure including:
  process name means for storing a preselected process name for said process; and
  process availability denoting means for denoting whether the running of the corresponding process is enabled or disabled;
 wherein
 said step of establishing an engineering set up control program includes enabling interactive computer controlled performance of the steps of:
  entering into the process name means in the process selection data structure for said specified process a name for said specified process; and
  entering into the process availability denoting means in the process selection data structure for said specified process a value to specify whether the running of said specified process is enabled or disabled; and
 said step of selecting one of said processes includes the steps of:
  displaying said process names; and
  selecting one of said processes which has a value in the corresponding process availability denoting means specifying it as enabled.

3. The method of claim 2, adapted to provide different operator access levels to the running of said multiplicity of specified processes,
 said engineering set up control program further enabling interactive computer controlled performance of the step of
  storing on each of a plurality of individual, operator-related, portable, nonvolatile storage means, said process selection and parameter data structures for each of said multiplicity of processes; and
 said method further including the step of
  reading and storing the data structures for a multiplicity of processes from one of said operator-related, portable, nonvolatile storage means, said data structures thereafter being available for use by both said engineering set up control program and said operator control program;
 wherein said process selection and parameter data structures can be modified using said engineering set up control program so that different ones of said operator-related storage means provide different operator access levels to the running of said specified processes.

4. The method of claim 2, further including the step of
 defining and storing a group data structure including
  group name means for storing a preselected group name for each of a plurality of prearranged groups of said specified processes; and
  group availability denoting means for each of said prearranged groups of said processes, denoting whether the running of the corresponding group of processes is enabled or disabled;
 said step of establishing an engineering set up control program includes enabling interactive computer controlled performance of the steps of
  entering into the group name means in said group data structure a group name for a specified group of processes; and
  entering into the group availability denoting means in said group data structure a value to specify whether the running of a specified group of processes is enabled or disabled;
said step of selecting one of said processes includes, prior to said step of displaying said process names, the steps of:
displaying said group names; and
selecting one of said groups which has a value in the corresponding group availability denoting means specifying it as enabled; and
said step of displaying said process names comprises displaying only process names associated with said selected group.

5. The method of claim 4, adapted for use on a computer which includes a computer display device, and further comprising the steps of:
defining a plurality of separate main menu items comprising said preselected group names of said prearranged groups of said specified processes;
defining a plurality of separate groups of auxiliary menu items, each being associated with at least one of said main menu items and comprising one of said preselected process names;
establishing at least two separate menu display regions on said computer display device, each being capable of displaying multiple menu items and an associated selectably positionable pointer to an individual menu item;
displaying in a first one of said menu display regions at least a plurality of said main menu items together with said associated pointer positioned at one of said displayed main menu items;
displaying simultaneously in a second one of said menu display regions at least a portion of one of said groups of auxiliary menu items associated with the main menu item being selected at in said first menu display region together with said associated pointed positions at one of said displayed auxiliary menu items;
automatically responding to a position change of said pointer in said first menu display region to point at a new main menu item by altering said second menu display region to display at least a portion of one of said groups of auxiliary menu items associated with the new main menu item being pointed at; and
wherein
said steps of entering a value into the group availability denoting means in said group data structure for a specified group, and entering a value into the process availability denoting means in said process selection data structure for a specified process, include the steps of
moving said selectably positionable pointer for the corresponding menu display region to point at the name of said specified group or the name of said specified process to select an associated one of said group availability denoting means or said process availability denoting means; and
entering said value.

6. The method of claim 5, wherein said displaying steps further include displaying items which are denoted in said group data structure and process selection data structure as enabled in a manner which visually distinguishes said items from those items which are denoted as not enabled.

7. The method of claim 1, adapted for use on a computer which includes a computer display device, and further comprising the steps of:

defining a prompt data structure including
process name means for storing a preselected process name for each of said specified processes; and
group name mens for storing a preselected group name for each of a plurality of prearranged groups of said specified processes;
defining a plurality of separate main menu items comprising said group names;
defining a plurality of separate groups of auxiliary menu items, each being associated with at least one of said main menu items and comprising one of said process names;
establishing at least two separate menu display regions on said computer display device, each being capable of displaying multiple menu items and an associated selectably positionable pointer to an individual menu item;
displaying in a first one of said menu display regions at least a plurality of said main menu items together with said associated pointer positioned at one of said displayed main menu items;
displaying simultaneously in a second one of said menu display regions at least a portion of one of said groups of auxiliary menu items associated with the main menu item being selected at in said first menu display region together with said associated pointer positions at one of said displayed auxiliary menu items; and
automatically responding to a position change of said pointer in said first menu display region to point at a new main menu item by altering said second menu display region to display at least a portion of one of said groups of auxiliary menu items associated with the new main menu item being pointed at;
whereby at least one of said steps of specifying one of said processes for engineering set up and selecting one of said processes, includes the steps of:
moving said pointer for said first menu display region to point at the group name corresponding to the process to be specified or selected; and
moving said pointer for said second menu display region to point at the process name corresponding to the process to be specified or selected.

8. The method of claim 1, adapted for use on a computer which includes a computer display device, and further comprising the steps of:
defining a prompt data structure including
process name means for storing a preselected process name for each of said specified processes; and
group name means for storing a preselected group name for each of a plurality of prearranged groups of said specified processes;
defining a plurality of separate main menu items comprising said group names;
defining a plurality of separate groups of auxiliary menu items, each being associated with at least one of said main menu items and comprising one of said process names;
establishing at least two separate menu display regions on said computer display device, each being capable of displaying multiple menu items and an associated selectably positionable pointer to an individual menu item;
displaying in a first one of said menu display regions at least a plurality of said main menu items together with said associated pointer positioned at one of said displayed main menu items;

displaying simultaneously in a second one of said menu display regions at least a portion of one of said groups of auxiliary menu items associated with the main menu item being selected at in said first menu display region together with said associated pointer positions at one of said displayed auxiliary menu items; and automatically responding to a position change of said pointer in said first menu display region to point at a new main menu item by altering said second menu display region to display at least a portion of one of said groups of auxiliary menu items associated with the new main menu item being pointed at;

wherein said step of establishing an engineering set up control program includes enabling interactive computer controlled performance of the steps of entering a new group name into said group name means in said prompt data structure for the group of processes corresponding to the item pointed at by the pointer in said first menu display region; and entering a new process name into said process name means in said prompt data structure for the process corresponding to the item pointed at by the pointer in said second menu display region.

9. The method of claim 8, wherein said step of establishing display regions provides three separate menu display regions on said computer display device; said method further including the steps of:

defining a set of preselected names for said set of established process control programs;

defining a program data structure for storing an idicia of the process control program associated with each of said specified processes; and displaying simultaneously in said third menu display region the names of the process programs corresponding to the process names displayed in said second menu display region;

wherein said step of establishing an engineering set up control program includes enabling interactive computer controlled performance of the step of selecting the process control program for the process corresponding to the item being pointed at in said second menu display region from said set of established process control programs, including entry of a corresponding indicia in said program data structure and displaying the name of said selected process control program in said third menu display region.

10. The method of claim 8, wherein said steps of entering a group name and entering a process name include the steps of:

designating a corresponding one of said selectably positionable pointers as the active pointer for name entering; and displaying the item being pointed at by said active pointer in a manner which visually distinguishes said item from the item being pointed at by said other selectably positionable pointer.

11. The method of claim 1, adapted for use on a computer which includes a computer display device, and further comprising the steps of:

defining a plurality of separate main menu items comprising preselected names of preselected groups of predefined engineering set up tasks;

defining a plurality of separate groups of auxiliary menu items, each being associated with at least one of said main menu items and comprising preselected names of said predefined engineering set up tasks;

establishing at least two separate menu display regions on said computer display device, each being capable of displaying multiple menu items and associated selectably positionable pointer to an individual menu item;

displaying in a first one of said menu display regions at least a plurality of said main menu items together with said associated pointer positioned at one of said displayed main menu items;

displaying simultaneously in a second one of said menu display regions at least a portion of one of said groups of auxiliary menu items associated with the main menu item being selected at in said first menu display region together with said associated pointer positions at one of said displayed auxiliary menu items;

automatically responding to a position change of said pointer in said first menu display region to point at a new main menu item by altering said second menu display region to display at least a portion of one of said groups of auxiliary menu items associated with the new main menu item being pointed at; and responding to a task signal by performing a task corresponding the item pointed at by the pointer in said second menu display region;

wherein one said predefined engineering tasks comprises a test set up task which enables interactive computer controlled performance of said steps of entering a value into said parameter denoting means of said parameter data structure for said specified process; and entering a value into the parameter value storing means in said parameter data structure for said specified process.

12. The method of claim 11, further including the step of:

defining a prompt data structure including process name means for storing a preselected process name for each of said specified processes; and group name means for storing a preselected group name for each of a plurality of prearranged groups of said specified processes;

wherein another one of said predefined engineering tasks comprises an operator prompt task which enables interactive computer controlled performance of the steps of entering a new group name into said group name means in said prompt data structure for a specified group of processes; and entering a new process name into said process name means in said prompt data structure for a specified process; and another one of said predefined engineering tasks comprises an update task for performing the step of storing said parameter data structure on a portable, nonvolatile storage means.

13. The method of claim 12, wherein during the performance of said operator prompt task,
- said group names are displayed in said first menu display region;
- said process names corresponding to the group name being pointed at in said first menu region are displayed in said second menu display region; and
- said selectably positionable pointers are used to specify the group and process used in said entering a new group name and entering a new process name steps.

14. The method of claim 11, further including the step of:
- defining an availability data structure including
  - process availability denoting means for each said specified process denoting whether the running of the corresponding process is enabled or disabled;
  - group availability denoting means for each of said prearranged groups of said processes, denoting whether the running of the corresponding group of processes is enabled or disabled;
- wherein
- another one of said predefined engineering tasks comprises an operator choices task which enables interactive computer controlled performance of the steps of
  - entering into said process availability denoting means in said availability data structure for said specified process a value to specify whether the running of said specified process is enabled or disabled; and
  - entering into said group availability denoting means in said availability data structure a value to specify whether the running of a specified group of processes is enabled or disabled.

15. The method of claim 14, further including the step of:
- defining a prompt data structure including
  - process name means for storing a preselected process name for each of said specified processes; and
  - group name means for storing a preselected group name for each of a plurality of prearranged groups of said specified processes;
- wherein
- another one of said predefined engineering tasks comprises an operator prompt task which enables interactive computer controlled performance of the steps of
  - entering a new group name into said group name means in said prompt data structure for a specified group of processes; and
  - entering a new process name into said process name means in said prompt data structure for a specified process;
- during the performance of said operator prompt task,
  - said group means are displayed in said first menu display region;
  - said process names corresponding to the group name being pointed at in said first menu region are displayed in said second menu display region; and
  - said selectably positionable pointers are used to specify the group and process used in said entering a new group name and entering a new process name steps; and another one of said predefined engineering tasks comprises an update task for performing the step of storing said parameter data structures on a portable, nonvolatile storage means.

16. The method of claim 1, further adapted for use with an automated resistivity test system including:
- a resistivity test probe having a plurality of signal leads for receiving an input current and returning an output voltage;
- means for responding to a command from said computer to supply a programmable level of current to said signal leads of said probe;
- means for responding to a command from said computer to receive said voltage output from said probe and for translating said output signal into a digital signal representatin of said voltage level; and
- means for responding to a command from said computer for positioning said probe at a test site comprising a programmable position coordinate on a semiconductor wafer for making a resistivity measurement thereat; and
- wherein said process control programs comprise a contour map program for making resistivity measurements at a two-dimensional array of test sites on said wafer and a diameter scan program for making resistivity measurements at a multiplicity of test sites along a prearranged diameter line of said wafer;
- said set of predefined parameters for said contour map program include a number of test sites parameter, a test diameter parameter, and a measure current parameter; said set of predefined parameters for said diameter scan program include a number of sites parameter, a test diameter parameter, a measure current parameter, and an angle of scan parameter;
- said contour map program enables said computer to direct said tester to carry out automatically the steps of:
  - using the values of said number of test sites and test diameter parameters to position said test probe on said wafer at each of a two-dimensional array of test sites within said test diameter on said wafer and corresponding to the number of test sites parameter value;
  - measuring the resistivity value at each said test site using said measure current parameter to supply a corresponding level of current to said test probe and receiving an associated digital representation of the output voltage produced thereby; and
  - storing said resistivity value for each of said test sites; and
- said diameter scan program enables said computer to direct said tester to carry out automatically the steps of:
  - using the values of said number of test sites, test diameter, and angle of scan parameters to position said test probe on said wafer at each of a plurality of regularly spaced test sites along a diameter of said wafer corresponding to said angle of scan parameter;
  - measuring the resistivity value at each said test site using said measure current parameter to supply a corresponding level of current to said test probe and receiving an associated digital representation of the output voltage produced thereby; and storing said resistivity value for each of said test sites.

17. The method of claim 1, said engineering set up control program further enabling interactive computer controlled performance of the step of storing on each of a plurality of individual, operated-related, portable, nonvolatile storage means, said parameter data structure for each of said multiplicity of processes; and said method further including the step of reading and storing the data structures for a multiplicity of processes from one of said operator-related, portable, nonvolatile storage means, said data structures thereafter being available for use by both said engineering set up control program and said operator control program;

wherein said parameter data structures can be modified using said engineering set up control program so that different ones of said operator-related storage means provide different operator control levels for running said specified processes.

18. In a method for displaying and selecting menu items on a computer display device, the steps of:

defining a plurality of separate main menu items;

defining a plurality of separate groups of auxiliary menu items, each being associated with at least one of said main menu items;

establishing at least three separate menu display regions on said computer display device, each being capable of displaying multiple menu items and an associated selectably positionable pointer to an individual menu item;

displaying in a first one of said menu display regions at least a plurality of said main menu items together with said associatedd pointer positioned at one of said displayed main menu items;

displaying simultaneously in a second one of said menu display regions at least a portion of one of said groups of auxiliary menu items associated with the main menu item being selected at in said first menu display region together with said associated pointer positions at one of said displayed auxiliary menu items;

automatically responding to a position change of said pointer in said first menu display region to point at a new main menu item by altering said second menu display region to display at least a portion of one of said groups of auxiliary menu items associated with the new main menu item being pointed at;

defining a plurality of groups of tertiary menu items, each group being associated with at least one of said auxilary menu items; and displaying simultaneously in a third one of said menu display regions at least a portion of one of said groups of tertiary menu items associated with said auxiliary menu item being pointed at in said second menu display regions together with said associated pointer positioned at one of said displayed tertiary menu items;

wherein said step of automatically responding to a position change of said poiner in said first menu display region further includes the step of simultaneously altering said third menu display region to display at least a portion of one of said groups of tertiary menu items associated with said second menu item being pointed at in said second display region; and said method further includes the step of automatically responding to a position change of said pointer in said second menu display region without a position change of said pointer in said first menu display region by simultaneously altering said third menu display region to display at least a portion of one of said groups of tertiary menu items associated with said new secondary menu item being pointed at in said second display region.

19. The method of claim 18, wherein said step of automatically responding to a position change of said pointer in said first menu display region further includes automatically repositioning said pointers in said second and third menu display regions to the first auxiliary menu item and first tertiary menu item displayed in said respective display regions.

20. The method of claim 18, further including the steps of:

designating one of said selectably positionable pointers as the active pointer; and visually distinguishing the item being pointed at by said active pointer from the item being pointed at by said other pointer.

21. The method of claim 18, further including the steps of:

displaying simultaneously at a predefined position of said display an indicia of a selection previously made using a set of menus distinct from the menus currently displayed.

22. The method of claim 18, further including the step of establishing a program for enabling the selection of items displayed in at least said second menu display region;

wherein said selected items are displayed in a visually distinct manner so that when said pointer for said first menu display region is moved through the items displayed in said first menu display region a person looking at said computer display device can see which items have been selected in each corresponding group of auxiliary menu items.

23. In a method for displaying and selecting menu items on a computer display device, the steps of:

defining a plurality of separate main menu items;

defining a plurality of separate groups of auxiliary menu items, each being associated with at least one of said main menu items;

establishing at least three separate menu display regions on said computer display device, each being capable of displaying multiple menu items and an associated selectably positionable pointer to an individual menu item;

displaying in a first one of said menu display regions at least a plurality of said main menu items together with said associated pointer positioned at one of said displayed main menu items;

displaying simultaneously in a second one of said menu display regions at least a portion of one of said groups of auxiliary menu items associated with the main menu item being selected at in said first menu display region together with said associated pointer positions at one of said displayed auxiliary menu items;

automatically responding to a position change of said pointer in said first menu display region to point at a new main menu item by altering said second menu display region to display at least a portion of one of said groups of auxiliary menu items associated with the new main menu item being pointed at;

defining a plurality of tertiary menu items, each said tertiary menu item corresponding to at least one of said auxiliary menu items; and displaying simultaneously in said third menu display region the tertiary menu items corresponding to the auxiliary menu items displayed in said second menu display region;

wherein said step of automatically responding to a position change of said pointer in said first menu display region further includes the step of simultaneously altering said third menu display region to display the tertiary menu items corresponding to the auxiliary menu items displayed in said second menu display region.

24. In a method of controlling a process using a programmed digital computer, the steps of:
(a) establishing a set of process control programs, each having associated therewith a set of predefined parameters required for its operation;
(b) defining a parameter data structure format for each of said process control programs, including
parameter denoting means for denoting each of said predefined parameters as an operator unalterable parameter having a fixed value, an operator alterable parameter having a default value, or a forced operator entry parameter that must be supplied with a value before the process is run; and
parameter value storing means for storing a value for each of said predefined parameters;
(c) establishing an engineering set up control program including
means for storing, for each of a multiplicity of specified processes, a parameter data structure in accordance with said parameter data structure format for a specified one of said process control programs;
parameter access means for entering into said parameter denoting means of said parameter data structure for a specified process a value for each of said predefined parameters to specify it as an operator unalterable parameter, an operator alterable parameter, or a forced operator entry parameter;
value set up means for entering into said parameter value storing means in said parameter data structure for a specified process fixed values for said operator unalterable parameters and default values for said operator alterable parameters; and
(d) establishing an operator control program including
operator process selection means for selecting a process and the corresponding parameter data structure defined and stored by said engineering set up control program;
value entry means, utilizing said stored parameter data structure for said selected process, for enabling operator entry of values for said operator alterable and forced operator entry parameters for said selected process; and
process enabling means for enabling the running of the process control program corresponding to said selected process only after values have been entered for all said forced operator entry parameters corresponding to said selected process.

25. The method of claim 24, further including the step of:
defining and storing for each of said multiplicity of specified processes a process selection data structure including:
process name means for storing a preselected process name for said process; and
process availability denoting means for denoting whether the running of the corresponding process is enabled or disabled;
wherein
said step of establishing an engineering set up control program includes establishing
availability set up means for entering into said process availability denoting means in said process selection data structure for a specified process a value to specify whether the running of said specified process is enabled or disabled; and
said operator process selection means established in said step of establishing an operator control program includes
means for restricting the selection of a process to those processes having a value in the corresponding process availability denoting means specifying it as enabled.

26. The method of claim 25 adapted to provide different operator access to the running of said multiplicity of specified processes,
said engineering set up control program including means for storing on each of a plurality of individual, operator-related, portable, nonvolatile storage means, a parameter data structure and a process selection data structure for each of said multiplicity of processes; and
wherein said method includes the step of reading and storing said parameter and process selection data structures for a multiplicity of processes from one of said operator-related, portable, nonvolatile storage means, said parameter and process selection data structures thereafter being available for use by both said engineering set up control program and said operator control program;
whereby
said process availability denoting means in the process selection data structures stored on said operator-related, portable, nonvolatile storage means controls the availability of each said process for use by said operator control program; and
said parameter and process selection data structures stored on each operator related, nonvolatile, storage means can be easily and quickly reconfigured by said engineering set up control program.

27. In a method of controlling a process using a programmed digital computer, the steps of:
(a) establishing a set of process control programs, each having associated therewith a set of predefined parameters required for its operation;
(b) defining a parameter data structure format for each of said process control programs, including
parameter denoting means for denoting each of said predefined parameters as an operator unalterable parameter having a fixed value, an operator alterable parameter having a default value, or a forced operator entry parameter that must be supplied with a value before the process is run; and parameter value storing means for storing a value for each of said predefined parameters;

(c) storing, for each of a multiplicity of specified processes, a parameter data structure in accordance with the parameter data structure format for a specified one of said process control programs;

(d) entering into said parameter denoting means of said parameter data structure for a specified process a value for each of said predefined parameters to specify it as an operator unalterable parameter, an operator alterable parameter, or a forced operator entry parameter;

(e) entering fixed values for said operator unalterable parameters and default values for said operator alterable parameters;

(f) selecting one of said processes;

(g) entering values for said operator alterable and forced operator entry parameters for said selected process; and (h) enabling the running of the process control program corresponding to said selected process only after values have been entered for all said forced operator entry parameters corresponding to said selected process.

28. In a process control system which uses a programmed digital computer, the combination comprising:

(a) means providing a set of process control programs, each having associated therewith a set of predefined parameters required for its operation;

(b) means for defining a parameter data structure format for each of said process control programs, including parameter denoting means for denoting each of said predefined parameters as an operator unalterable parameter having a fixed value, an operator alterable parameter having a default value, or a forced operator entry parameter that must be supplied with a value before the process is run; and parameter value storing means for storing a value for each of said predefined parameters;

(c) engineering set up control program means including means for storing, for each of a multiplicity of specified processes, a parameter data structure in accordance with the parameter data structure format for a specified one of said process control programs;

parameter access means for entering into said parameter denoting means of said parameter data structure for a specified process a value for each of said predefined parameters to specifyit as an operator unalterable parameter, an operator alterable parameter, or a forced operator entry parameter;

value set up means for entering fixed values for said operator unalterable parameters and default values for said operator alterable parameters; and (d) operator control program means including operator process selection means for selecting a process and the corresponding parameter data structure defined and stored by said engineering set up control program;

value entry means, utilizing said stored parameter data structure for said selected process, for enabling operator entry of values for said operator alterable and forced operator entry parameters for said selected process; and process initiation means for running the process control program corresponding to said selected process, including process enabling means for enabling the running of the process control program corresponding to said selected process only after values have been entered for all said forced operator entry parameters corresponding to said selected process.

29. In a method of controlling a process using a programmed digital computer, the steps of:

(a) establishing a set of process control programs, each having associated therewith a set of predefined parameters required for its operation;

(b) defining a process data structure format for each of said process control programs, including process availability denoting means for denoting whether the running of the corresponding process control program is enabled or disabled;

parameter value storing means for storing a value for each of said predefined parameters; and parameter denoting means for denoting each of said predefined parameters as an operator unalterable parameter having a fixed value, an operator alterable parameter having a default value, or a forced operator entry parameter that must be supplied with a value before the process is run;

(c) establishing an engineering set up control program for enabling interactive computer controlled performance of the steps of storing, for each of a multiplicity of specified processes, a process data structure in accordance with said process data structure format for a specified one of said process control programs;

specifying one of said processes for engineering set up;

entering into said process availability denoting means in said process data structure for a specified process a value to specify whether the running of said specified process is enabled or disabled; and entering into the parameter value storing means in said process data structure for said specified process fixed values for said operator unalterable parameters and default values for said operator alterable parameters; and storing on each of a plurality of individual, operator-related, portable, nonvolatile storage means, a process data structure for each of said multiplicity of processes;

(d) establishing a reading and storing program for reading and storing said process data structures for a multiplicity of processes from one of said operator-related, portable, nonvolatile storage means, said process data structures thereafter being available for use by said engineering set up control program and by other programs in said computer;

(e) establishing an operator control program for enabling interactive computer controlled performance of the steps of selecting one of said processes, restricting the selection of a process to those processes having a corresponding process data structure wherein the running of the process is denoted as enabled;

utilizing said stored process data structure for said selected process, enabling operator entry of values for said operator alterable and forced operator entry parameters for said selected process; and enabling the running of the process control program corresponding to said selected process only after values have been entered for all said forced operator entry parameters corresponding to said selected process;

whereby said process availability denoting means in each said process data structure stored on said operator-related, portable, nonvolatile storage means controls the availability of said processes for use by said operator control program; and said process data structures stored on each operator-related, nonvolatile, storage means can be easily and quickly reconfigured by said engineering set up control program.

30. The method of claim 29, wherein said operator-related, portable, nonvolatile storage means is also used to store the data, if any, produced by the running of the process control program corresponding to said selected process.

31. In a method of using a programmed digital computer having a display to select an item from a set of predefined items, the steps of:

(a) establishing a plurality of groups of said predefined tasks, and a plurality of subgroups for at least a plurality of said groups, each said subgroup having a predefined set of member items;

(b) establishing an item name for each said item, a subgroup name for each said subgroup, and a group name for each said group;

(c) defining at least three menu display regions on said display, each for displaying a distinct menu, and for each said menu display region, establishing a moveable pointer for pointing to one item in its corresponding menu display region; wherein the position of each menu display region is independent of the position of said moveable pointers;

(d) simultaneously displaying in a first one of said menu display regions a menu of said group names; and in a second one of said menu display regions a menu of at least a subset of the subgroup names for one of said groups of items;

in a third one of said menu display regions a menu of of at least a subset of the item names for one of said subgroup names in said second menu;

(e) responding to movement of said first menu pointer from one item to another item within said first menu by automatically updating said second menu so as to display the subgroup names corresponding to the group name pointed to by said first menu pointer, automatically adjusting said second pointer to point at a subgroup name in said second menu, and automatically updating said third menu so as to display the item names corresponding to the subgroup name pointed to by said second menu pointer; and (f) responding to movement of said second menu pointer from one item to another item within said second menu by automatically updating said third menu so as to display the item names corresponding to the subgroup name pointed to by said second menu pointer.

32. The method of claim 31, further including the step of establishing a program for enabling the selection of specified ones of said items and specified ones of said subgroups;

wherein said selected items and subgroups are displayed in a visually distinct manner so that when said first and second menu pointers are moved through the group names displayed in said first menu display region and the subgroups name displayed in said second menu display region, a person looking at said display can see which items have been selected in each corresponding group and subgroup.

* * * * *